(12) United States Patent
Ma et al.

(10) Patent No.: US 11,085,547 B2
(45) Date of Patent: Aug. 10, 2021

(54) ADJUSTABLE VALVE

(71) Applicant: ILLINOIS TOOL WORKS INC., Glenview, IL (US)

(72) Inventors: Yue Ma, Shanghai (CN); Michael Henker, Shanghai (CN); Ziteng Zheng, Shanghai (CN); Sheng Feng, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/741,264

(22) Filed: Jan. 13, 2020

(65) Prior Publication Data
US 2020/0224777 A1 Jul. 16, 2020

(30) Foreign Application Priority Data

Jan. 14, 2019 (CN) .......................... 201910033574.1
Jan. 8, 2020 (CN) .......................... 202010018387.9

(51) Int. Cl.
*F16K 11/02* (2006.01)
*F16K 11/087* (2006.01)
*F16K 11/10* (2006.01)

(52) U.S. Cl.
CPC .......... *F16K 11/02* (2013.01); *F16K 11/0876* (2013.01); *F16K 11/10* (2013.01)

(58) Field of Classification Search
CPC .. F16K 11/10; F16K 11/165; F16K 31/52466; F16K 31/5284; F16K 11/163; F16K 11/18; F16K 11/22; B60H 2001/00935; B60H 1/00485
See application file for complete search history.

(56) References Cited

U.S. PATENT DOCUMENTS 2,539,221 A * 1/1951 Badeaux ............... F16K 31/524
137/599.11
2,941,788 A 6/1960 Braun
5,247,964 A 9/1993 DeLange
(Continued)

FOREIGN PATENT DOCUMENTS

CN 103114902 A 5/2013
DE 1298805 B 9/1969
(Continued)

OTHER PUBLICATIONS

Extended European Search Report for European Patent Application No. 20151521.0, dated Jun. 4, 2020. (9 pages).

*Primary Examiner* — Michael R Reid
(74) *Attorney, Agent, or Firm* — Quarles & Brady LLP

(57) ABSTRACT

A regulating valve has a housing, a first valve body, a second valve body, a third valve body, a fourth valve body, and an actuating shaft. The housing has a first cavity and a second cavity. The first valve body is disposed in the first cavity. The second valve body is disposed in the first cavity, and the first valve body and the second valve body can rotate about a first axis X. The third valve body is disposed in the second cavity. The fourth valve body is disposed in the first cavity, and the third valve body and the fourth valve body can rotate about a second axis Y. The actuating shaft is rotatably disposed in the first cavity, and the actuating shaft can selectively drive one or more of the first valve body, the second valve body, the third valve body, and the fourth valve body to rotate.

19 Claims, 29 Drawing Sheets

(56) References Cited

U.S. PATENT DOCUMENTS

| | | | |
|---|---|---|---|
| 9,556,962 B2* | 1/2017 | Kawasaki | F16K 11/166 |
| 10,094,268 B1 | 10/2018 | Russalian | |
| 10,107,175 B1 | 10/2018 | Bowler et al. | |
| 2010/0282190 A1 | 11/2010 | Stoermer | |
| 2013/0048084 A1* | 2/2013 | Bartnick | F16K 11/165 |
| | | | 137/1 |

FOREIGN PATENT DOCUMENTS

| | | |
|---|---|---|
| EP | 0364108 A1 | 4/1990 |
| WO | 2015013323 A1 | 1/2015 |

* cited by examiner

ADJUSTABLE VALVE

TECHNICAL FIELD

The present disclosure relates to a valve, and more specifically to a regulating valve being able to adjust flow and control the connection and disconnection of passage.

BACKGROUND

A regulating valve is applied in a vehicle. The regulating valve controls a flow path of a cooling liquid by connecting different thermal control passages inside the vehicle, in order to regulate the temperature of various components inside the vehicle. The regulating valve generally comprises a housing and a valve body disposed inside the housing. The housing is provided with housing flow ports. Each housing flow port is connected to a temperature regulating system inside the vehicle via a pipeline. The valve body is provided with an opening. The valve body can rotate under an actuator, such that different opening of the valve body is aligned with a housing flow port to fluidly connect different flow ports of the housing, and then to fluidly connect different temperature regulating passages in the temperature regulating system.

As more and more components, which need to be regulated, is provided inside the vehicle, the number of flow ports on the housing is increasing. A regulating valve is needed to provide more fluid passages, thereby achieving different flow paths to form different thermal control passages.

SUMMARY OF THE DISCLOSURE

Exemplary embodiments of the present disclosure can address at least some of the above problems.

The present disclosure provides an adjustable valve, comprising a housing, a first valve body, a second valve body, a third valve body, a fourth valve body, and an actuating shaft. The housing has a first cavity and a second cavity. The first valve body is disposed in the first cavity. The second valve body is disposed in the first cavity, and the first valve body and the second valve body can rotate about a first axis X. The third valve body is disposed in the second cavity. The fourth valve body is disposed in the first cavity, and the third valve body and the fourth valve body can rotate about a second axis Y. The actuating shaft is rotatably disposed in the first cavity, and the actuating shaft can selectively drive one or more of the first valve body, the second valve body, the third valve body, and the fourth valve body to rotate.

According to the adjustable valve, the adjustable valve further comprises a first engagable and disengagable actuating structure, a second engagable and disengagable actuating structure, and a third engagable and disengagable actuating structure provided on the actuating shaft.

During the rotation of the actuating shaft, the first engagable and disengagable actuating structure, the second engagable and disengagable actuating structure, and the third engagable and disengagable actuating structure can rotate together.

According to the adjustable valve, the adjustable valve further comprises a first engagable and disengagable actuated structure, a second engagable and disengagable actuated structure, a third engagable and disengagable actuated structure and a fourth engagable and disengagable actuated structure. The first engagable and disengagable actuated structure is provided on the first valve body. The first engagable and disengagable actuated structure can be cooperated with the first engagable and disengagable actuating structure to form a first engaging and disengaging structure, such that the first valve body can engage or disengage with the actuating shaft. The second engagable and disengagable actuated structure is provided on the second valve body, wherein the second engagable and disengagable actuated structure can be cooperated with the second engagable and disengagable actuating structure to form a second engaging and disengaging structure, such that the second valve body can engage or disengage with the actuating shaft. The third engagable and disengagable actuated structure is provided on the third valve body, wherein the third engagable and disengagable actuated structure can be cooperated with the third engagable and disengagable actuating structure to form a third engaging and disengaging structure, such that the third valve body can engage or disengage with the actuating shaft. The fourth engagable and disengagable actuated structure is provided on the fourth valve body, wherein the fourth engagable and disengagable actuated structure can be cooperated with the third engagable and disengagable actuating structure to form a fourth engaging and disengaging structure, such that the fourth valve body can engage or disengage with the actuating shaft.

According to the adjustable valve, the first engagable and disengagable actuating structure comprises a plurality of first rods, and the first engagable and disengagable actuated structure comprises a plurality of first grooves. The second engagable and disengagable actuating structure comprises a second rod, and the second engagable and disengagable actuated structure comprises a second groove. The third engagable and disengagable actuating structure comprises a third rod, the third engagable and disengagable actuated structure comprises a third groove, and the fourth engagable and disengagable actuated structure comprises a fourth groove.

According to the adjustable valve, when the actuating shaft rotates within a first angle range, at least one of the plurality of first rods can engage with one of the plurality of first grooves, such that the actuating shaft can drive the first valve body to rotate. When the actuating shaft rotates within a second angle range, the second rod can engage with the second groove, such that the actuating shaft can drive the second valve body to rotate. When the actuating shaft rotates within a third angle range, the third rod can engage with the third groove, such that the actuating shaft can drive the third valve body to rotate. When the actuating shaft rotates within a fourth angle range, the third rod can engage with the fourth groove, such that the actuating shaft can drive the fourth valve body to rotate.

According to the adjustable valve, the first cavity has a first group of flow ports on cavity wall thereof, and the second cavity has a second group of flow ports on cavity wall thereof. The first valve body has a first group of openings thereon, the second valve body has a second group of opening thereon, the third valve body has a third group of opening thereon, and the fourth valve body has a fourth group of opening thereon.

According to the adjustable valve, the top portion of the housing has step portion, the second cavity is provided above the step portion and the first cavity is provided below the step portion, such that the second cavity is at least partially located above the first cavity.

According to the adjustable valve, the second group of flow ports include a pump outlet flow port. The upper portion of the first cavity is used for connecting to pump inlet and the pump outlet flow port is used for connecting to the pump outlet, such that the first cavity can fluidly connect the second cavity via the pump.

According to the adjustable valve, the adjustable valve further comprises a first group of sealing elements and a second group of sealing elements.

Each sealing element of the first group of sealing elements is respectively disposed between the first valve body and corresponding one of the first group of flow ports, between the second valve body and corresponding one of the first group of flow ports, between the fourth valve body and corresponding one of the first group of flow ports.

The second group of flow ports include seventh flow port and eighth flow port, one of the second group of sealing elements is disposed between the third valve body and the seventh flow port, and another of the second group of sealing elements is disposed between the third valve body and the eighth flow port.

According to the adjustable valve, an actuator is disposed under the housing, and the actuating shaft is actuated by the actuator to rotate.

The adjustable valve of the present disclosure can realize the connection and disconnection of different fluid passages, and can control the flow of each passage, which is beneficial to the integrated design of the system.

BRIEF DESCRIPTION OF THE DRAWINGS

The features and advantages of the present disclosure may be better understood by reading the following detailed description with reference to the accompanying drawings. In all the accompanying drawings, the same reference numerals represent the same parts, wherein.

DETAILED DESCRIPTION OF EMBODIMENTS

Figure 1A:
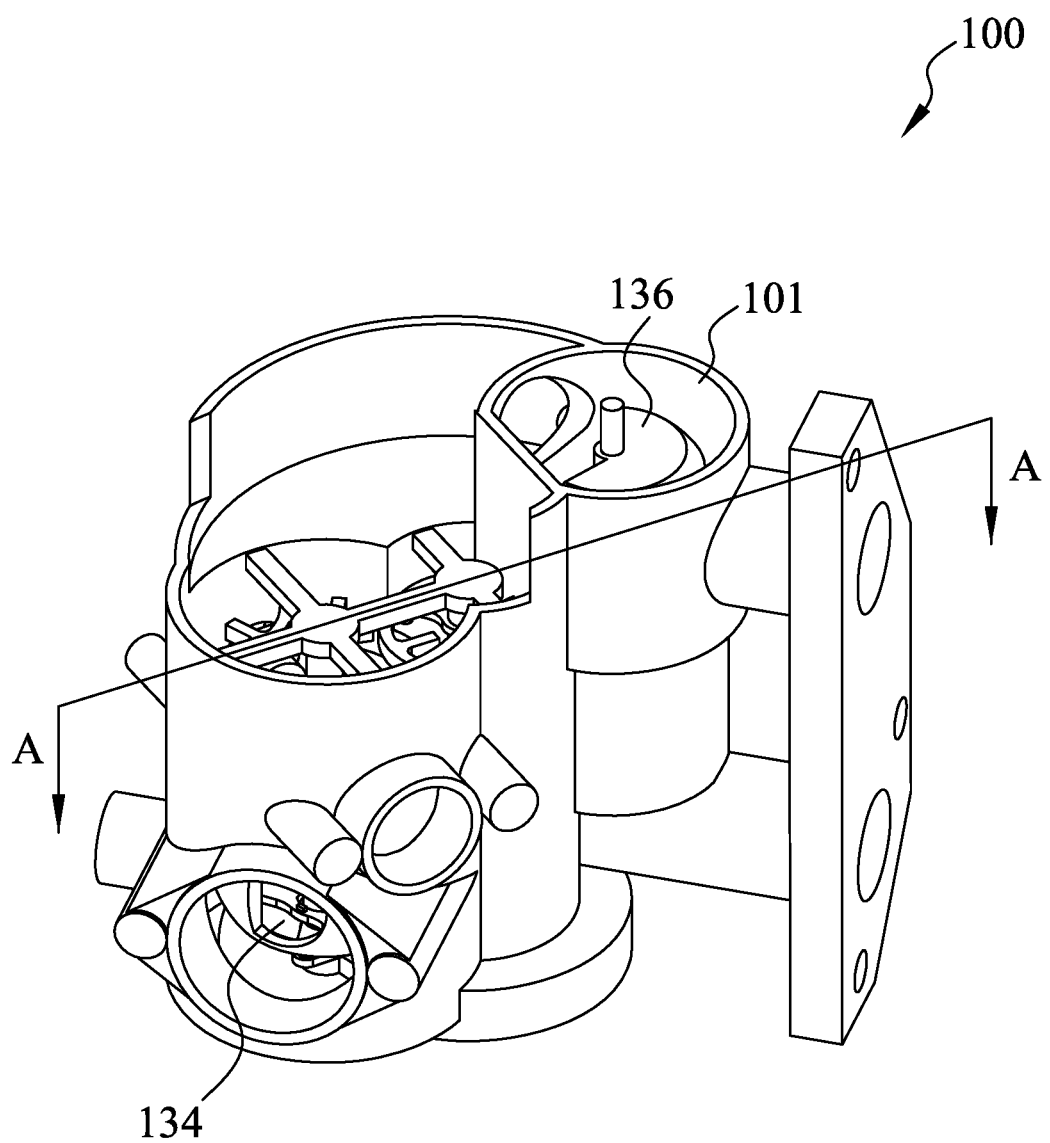
FIG. 1A is a perspective view of a regulating valve according to an embodiment of the present disclosure.

Particular embodiments of the present disclosure are described below with reference to the accompanying drawings which constitute part of this description. It should be understood that, in the following accompanying drawings, the same reference numerals are used for the same components, and similar reference numerals are used for similar components.

Particular embodiments of the present disclosure are described below with reference to the accompanying drawings which constitute part of this description. It is to be understood that although the terms indicating orientations, such as "front", "rear", "upper", "lower", "left", "right", "inner", "outer", "top" and "bottom", are used in the present disclosure to describe structural parts and elements in various examples of the present disclosure, these terms are used herein only for ease of illustration and are determined based on the exemplary orientations as shown in the accompanying drawings. Since the embodiments disclosed in the present disclosure can be arranged in different directions, these terms indicating directions are only illustrative and should not be considered as limitations.

The ordinal numbers such as "first" and "second" used in the disclosure are only used for distinguishing and identifying, and do not have any other meaning. If nothing is specified, they do not represent a specific order or have a specific relevance. For example, the term of "first part" itself does not imply the existence of "second part", nor does the term of "second part" itself imply the existence of "first part".

Figure 1B:
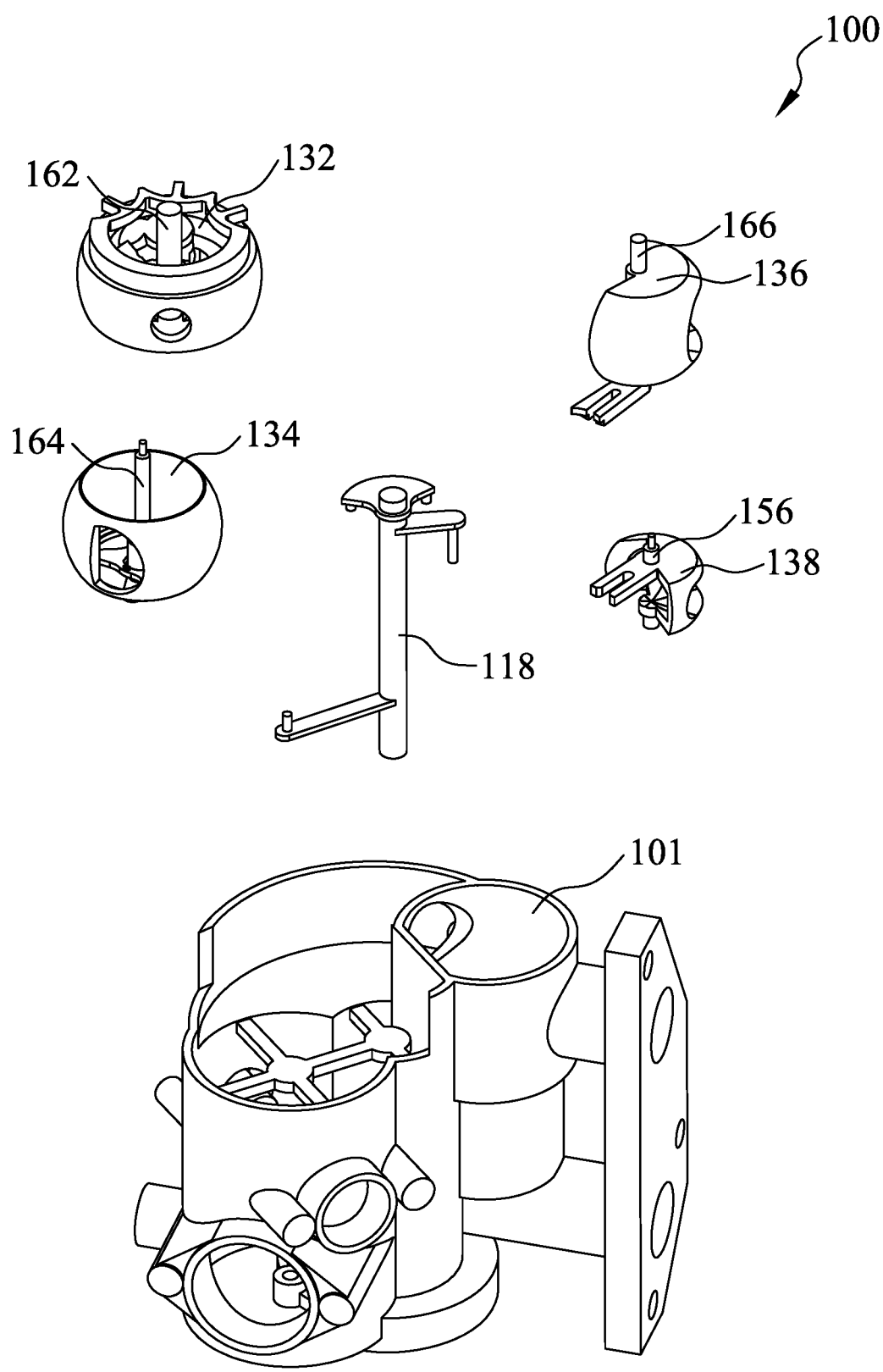
FIG. 1B is an exploded view of the regulating valve shown in FIG. 1A.
Figure 1C:
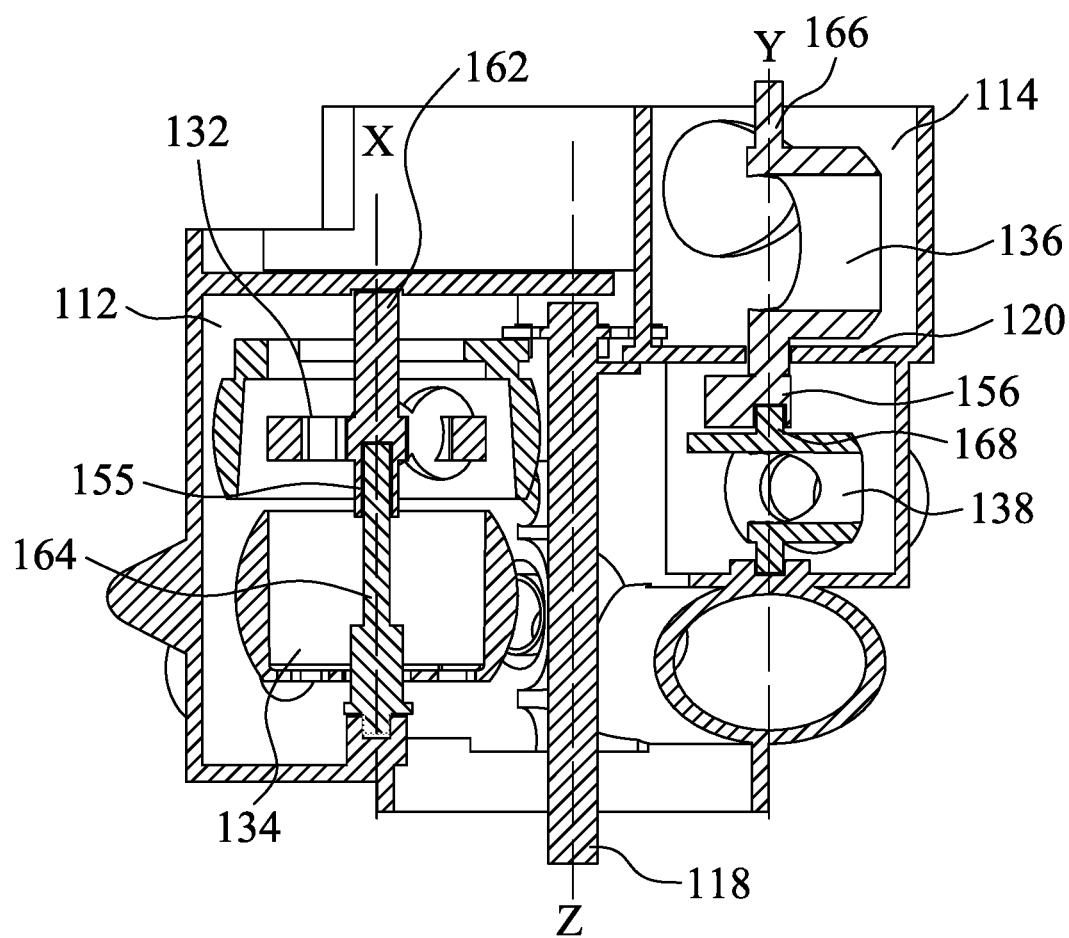
FIG. 1C is a cross-sectional view of the regulating valve shown in FIG. 1A taken along a section line A-A in FIG. 1A.

FIG. 1A is a perspective view of a regulating valve 100 according to an embodiment of the present disclosure. FIG. 1B is an exploded view of the regulating valve 100 shown in FIG. 1A. FIG. 1C is a vertical downward cross-sectional view of the regulating valve 100 shown in FIG. 1A taken along a section line A-A in FIG. 1A. In order to clearly show main components in the regulating valve 100, sealing elements provided at respective flow ports are not shown in FIGS. 1A-1C. As shown in FIGS. 1A-1C, the regulating valve 100 comprises a housing 101, a first valve body 132, a second valve body 134, a third valve body 136, and a fourth valve body 138. The housing 101 has a first cavity 112 and a second cavity 114. The first valve body 132, the second valve body 134, and the fourth valve body 138 are disposed in the first cavity 112, and the third valve body 136 is disposed in the second cavity 114. A sleeve 155 is provided at the bottom of a rotating shaft 162 of the first valve body 132. The sleeve 155 is sleeved at the top of a rotating shaft 164 of the second valve body 134, such that the first valve body 132 and the second valve body 134 can rotate about the same first axis X. A lower portion of a rotating shaft 166 of the third valve body 136 passes through a first transversal partition plate 120 of the first cavity 112 and the second cavity 114 and then extends into the first cavity 112. A sleeve 156 is provided at the bottom of the third valve body 136. The sleeve 156 is sleeved at the top of a rotating shaft 168 of the fourth valve body 138, such that the third valve body 136 and the fourth valve body 138 can rotate about the same second axis Y.

The regulating valve 100 further comprises an actuating shaft 118. The actuating shaft 118 is disposed in the first cavity 112 and can rotate about a third axis Z. The first valve body 132 and the second valve body 134 are disposed on a left side of the actuating shaft 118, and the third valve body 136 and the fourth valve body 138 are disposed on a right side of the actuating shaft 118. The regulating valve 100 further comprises a first engaging and disengaging structure, a second engaging and disengaging structure, a third engaging and disengaging structure, and a fourth engaging and disengaging structure. When the actuating shaft 118 rotates, the first valve body 132, the second valve body 134, the third valve body 136, and the fourth valve body 138 can respectively and selectively rotate together with the actuating shaft 118 via the first engaging and disengaging structure, the second engaging and disengaging structure, the third engaging and disengaging structure, and the fourth engaging and disengaging structure.

Figure 2:
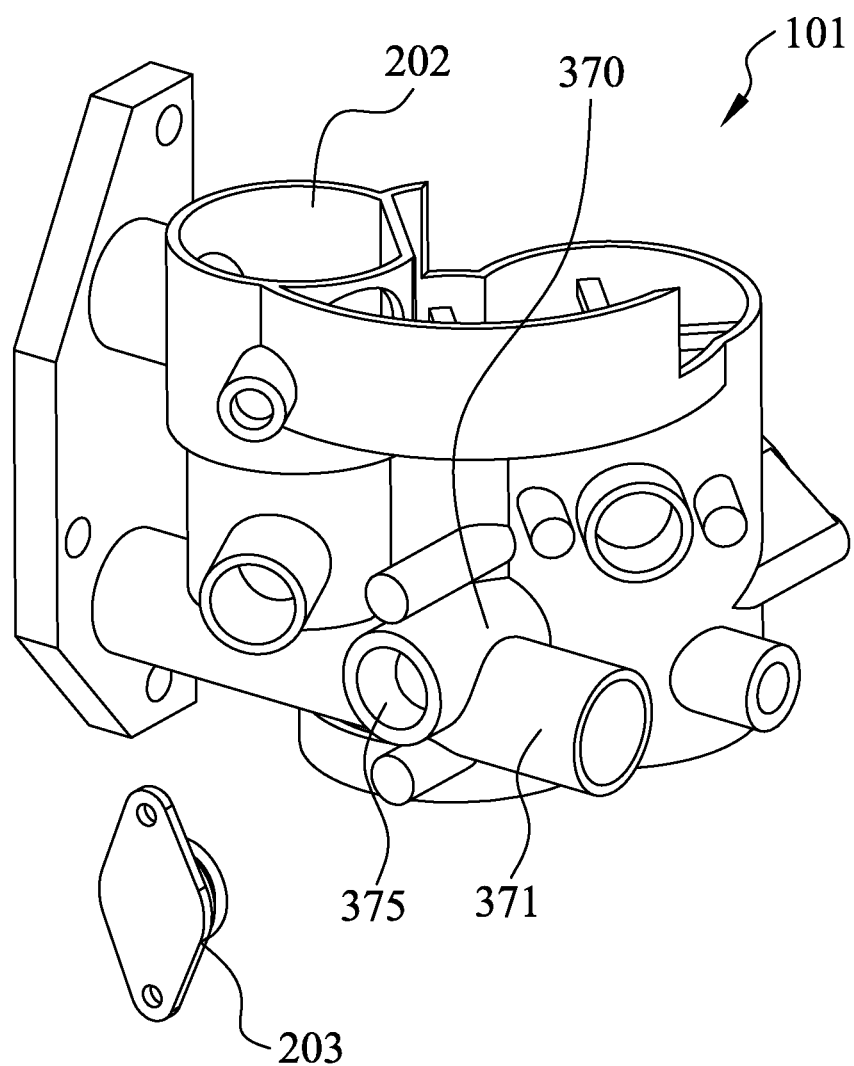
FIG. 2 is an exploded view of a housing shown in FIG. 1A.

FIG. 2 is an exploded view of the housing 101 shown in FIG. 1A. As shown in FIG. 2, the housing 101 comprises a housing body 202 and a cover 203. The size of the cover 203 can cooperate with the size of an orifice 375 of a pipe 370 on the housing body 202. The cover 203 can be mounted on the orifice 375 and blocks the orifice 375, so that a fluid in the housing 101 cannot flow into or out of the housing 101 through the orifice 375.

Figure 3A:
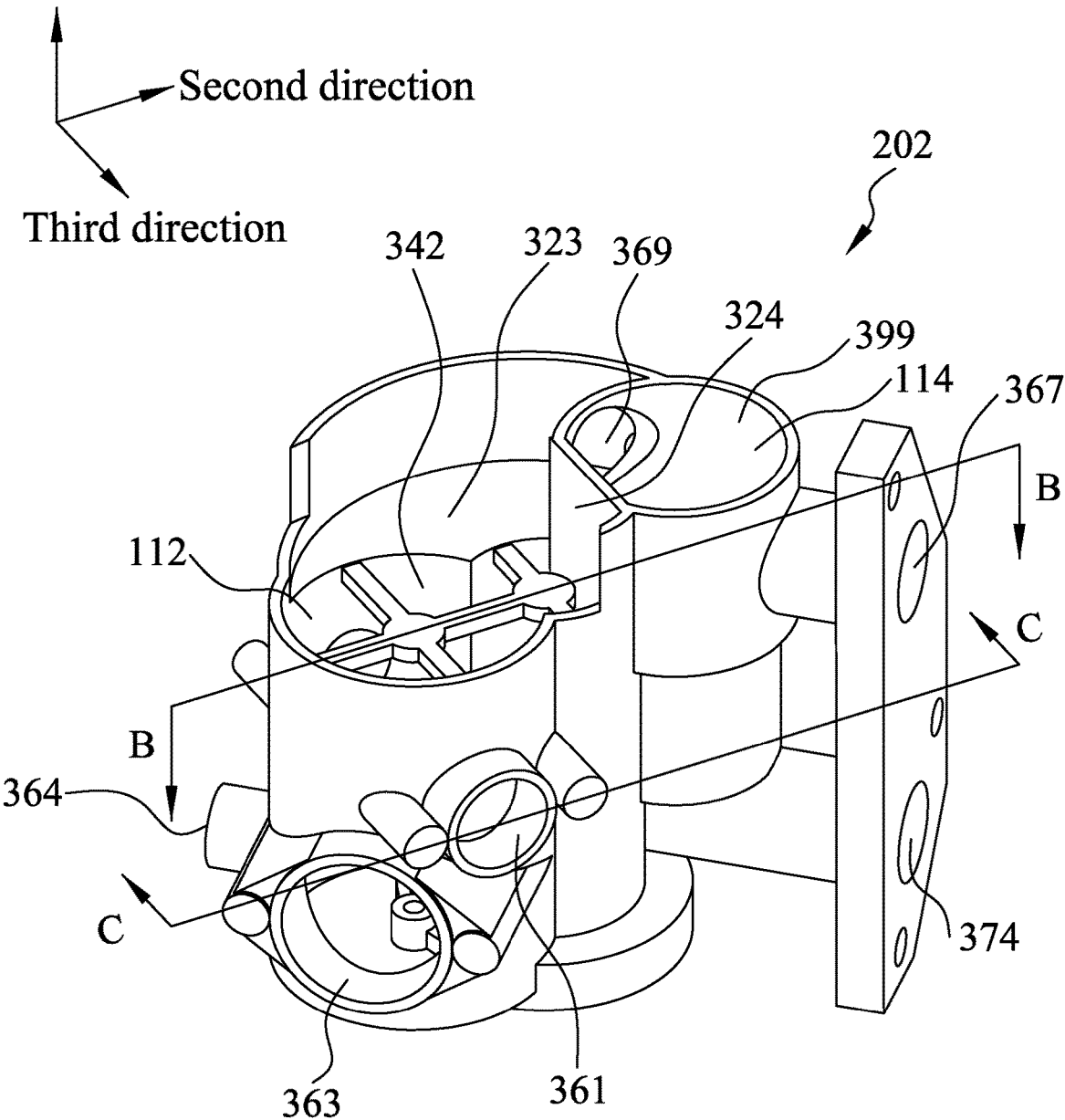
FIG. 3A is a perspective view of a housing body shown in FIG. 2 as viewed from top to bottom.
Figure 3B:
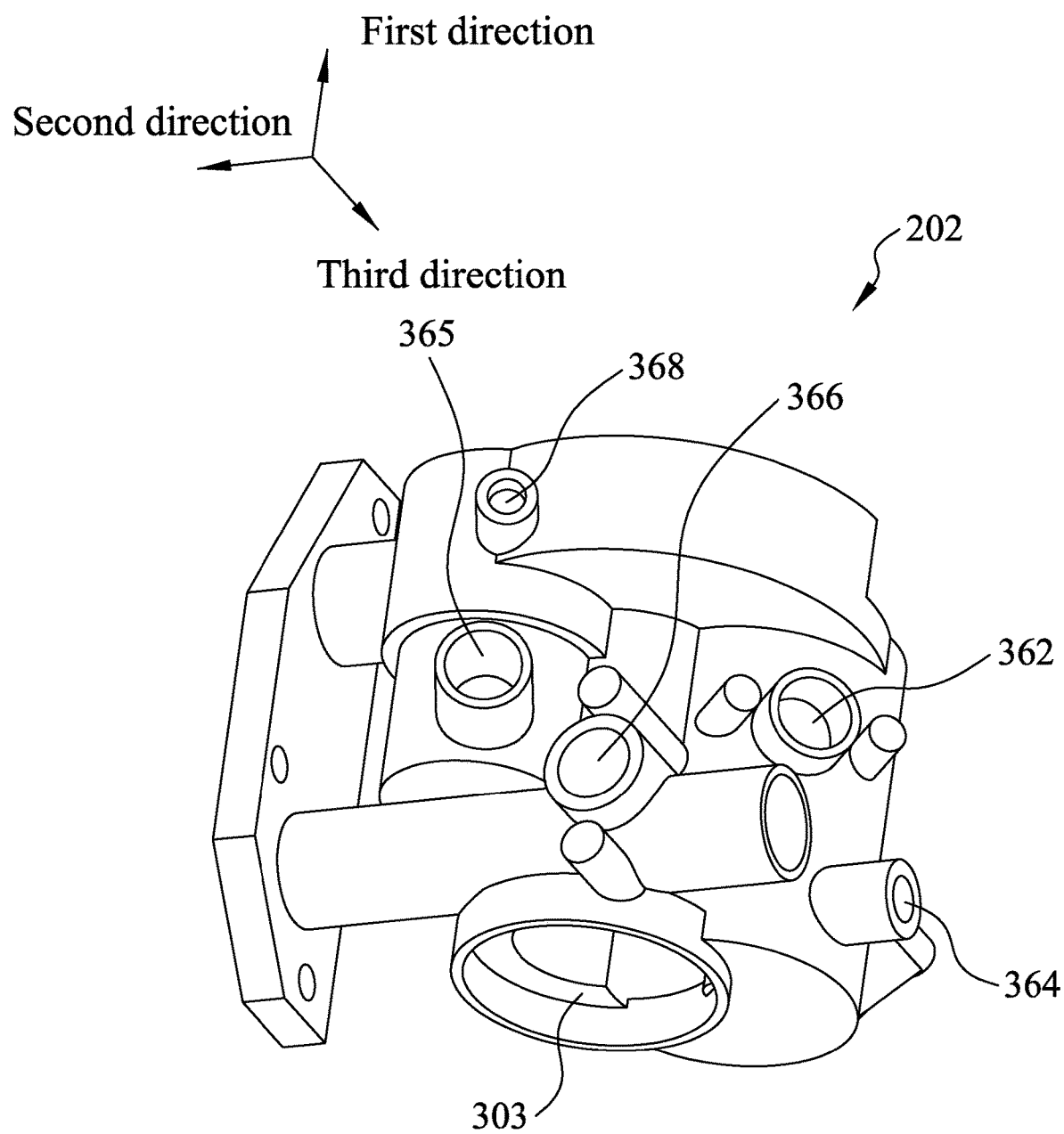
FIG. 3B is a perspective view of the housing body shown in FIG. 2 as viewed from bottom to top.
Figure 3C:
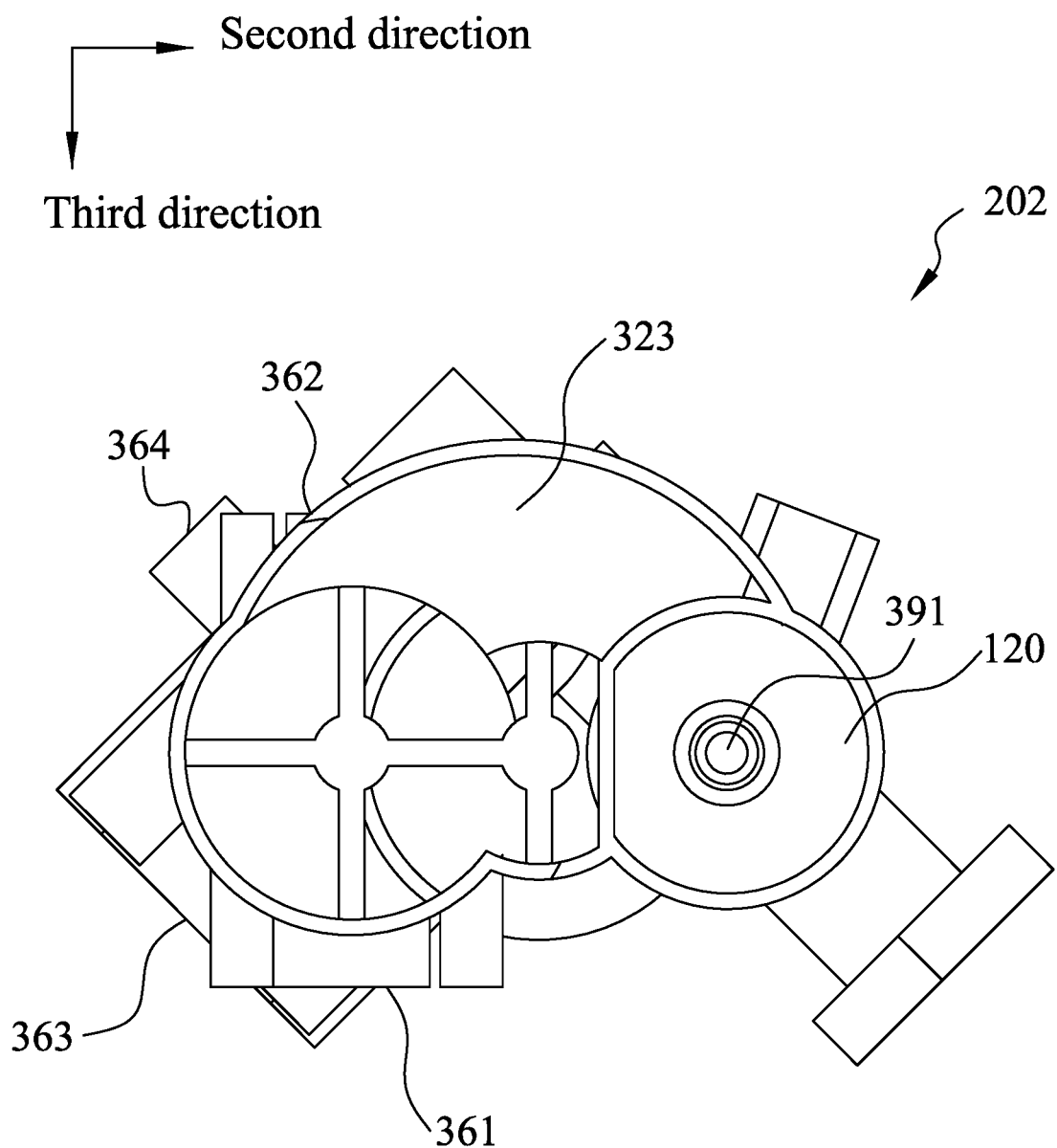
FIG. 3C is a top view of the housing body shown in FIG. 2.
Figure 3D:
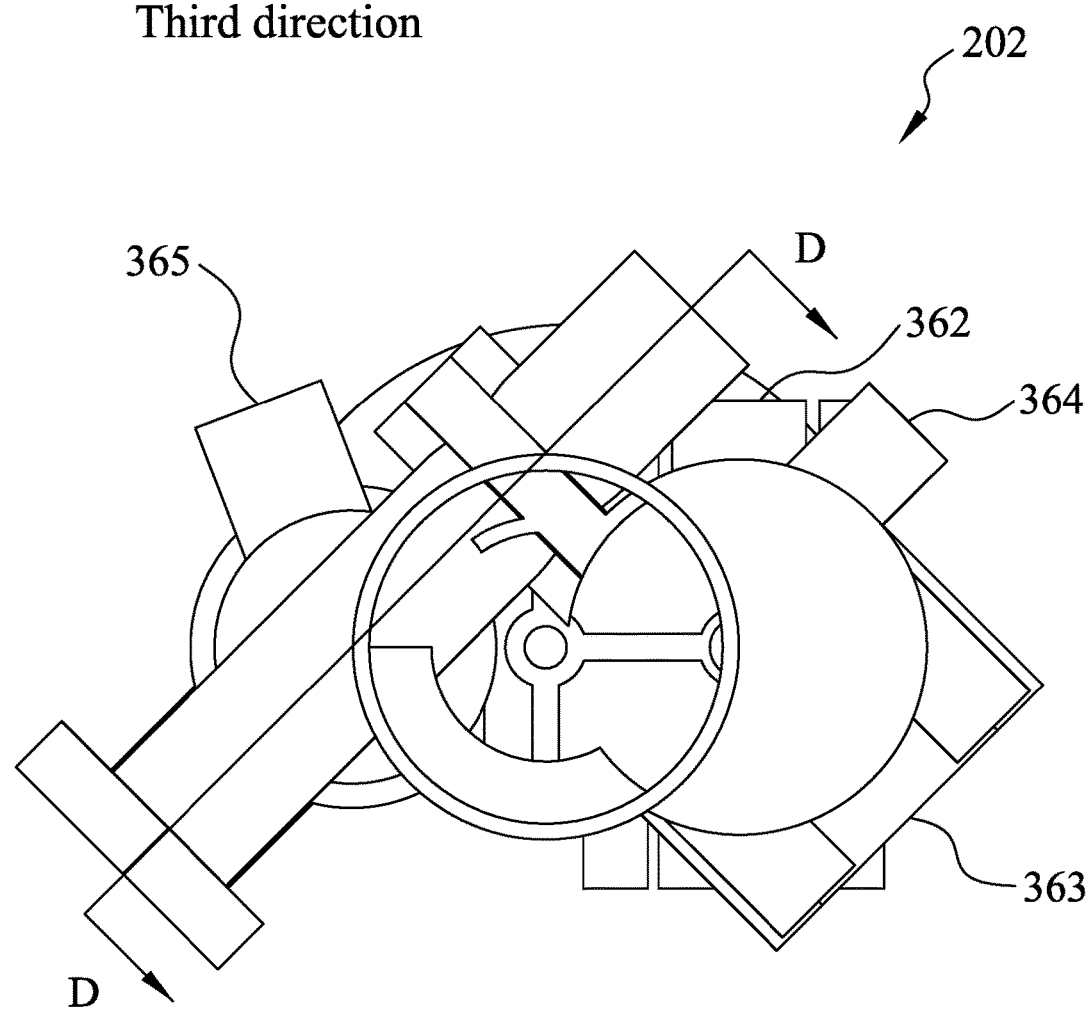
FIG. 3D is a bottom view of the housing body shown in FIG. 2.
Figure 3E:
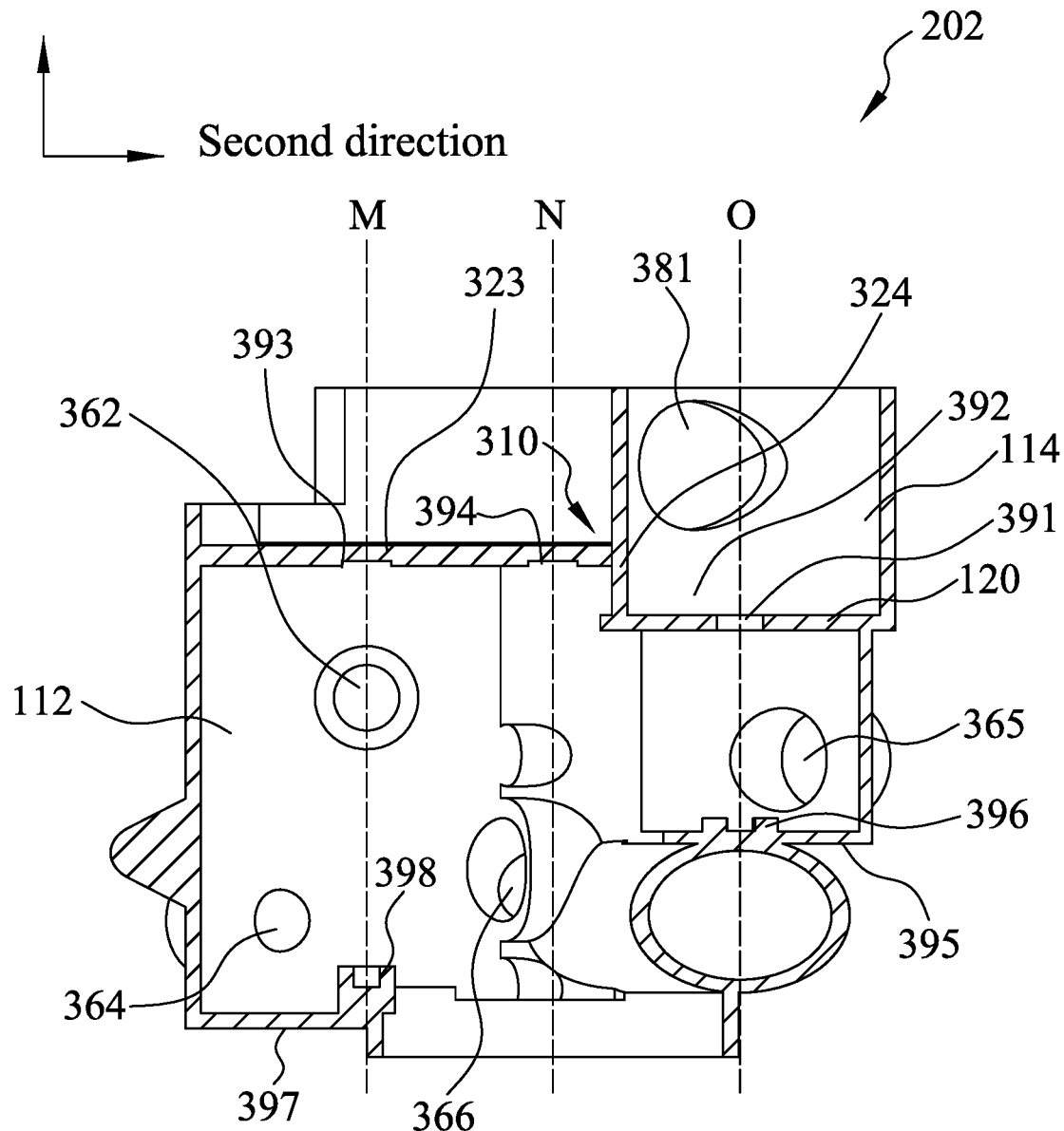
FIG. 3E is a cross-sectional view of the housing body shown in FIG. 2 taken along a section line B-B in FIG. 3A.

FIG. 3A is a perspective view of the housing body 202 shown in FIG. 2 as viewed from top to bottom in front of the housing 101. FIG. 3B is a perspective view of the housing body 202 shown in FIG. 2 as viewed from bottom to top in back of the housing 101. FIGS. 3C and 3D are respectively a top view and a bottom view of the housing body 202 shown in FIG. 2. FIG. 3E is a vertical downward cross-sectional view of the housing body 202 shown in FIG. 2 taken along a section line B-B in FIG. 3A, showing more structural details inside the housing body 202. In order to better describe the structure of the housing body 202, in the present disclosure, an extension direction of each of the first axis X, the second axis Y, and the third axis Z is taken as a first direction, the direction of a horizontal connecting line between the first axis X and the third axis Z is taken as a second direction, and the direction perpendicular to the first direction and the second direction is taken as a third direction.

As shown in FIGS. 3A-3E, the housing body 202 has a top plate. The top plate comprises a first transversal partition plate 120, a second transversal partition plate 323, and a vertical partition plate 324. The first transversal partition plate 120 and the second transversal partition plate 323 are provided to have a height difference in the first direction to form a step portion 310. The first cavity 112 is provided below the first transversal partition plate 120 and the second transversal partition plate 323, and the second cavity 114 is provided above the first transversal partition plate 120, so that the top of the second cavity 114 is partially higher than the top of the first cavity 112 in the first direction.

A perforation 391 is provided in the first transversal partition plate 120. The lower portion of the third valve body 136 can pass through the perforation 391, so that the lower portion of the third valve body 136 extends into the first cavity 112, and the third valve body 136 can rotate about the second axis Y.

A first bottom plate 395 of the first cavity 112 has a concave portion 396 for receiving a lower portion of the fourth valve body 138. An upper portion of the fourth valve body 138 is connected to the lower portion of the third valve body 136, and the lower portion of the fourth valve body 138 is received in the concave portion 396 of the first bottom plate 395, so the fourth valve body 138 can be disposed in the first cavity 112 and can rotate about the second axis Y.

The second transversal partition plate 323 has a concave portion 393 for receiving an upper portion of the first valve body 132. A second bottom plate 397 of the first cavity 112 has a concave portion 398 for receiving a lower portion of the second valve body 134. Because a lower portion of the first valve body 132 is sleeved with an upper portion of the second valve body 134, the first valve body 132 and the second valve body 134 can be disposed together in the first cavity 112 and can rotate about the first axis X.

The second transversal partition plate 323 also has a concave portion 394 for receiving an upper portion of the actuating shaft 118, such that when an actuator (not shown) drives the actuating shaft 118 to rotate, the actuating shaft 118 can rotate about the third axis Z.

Figure 3F:
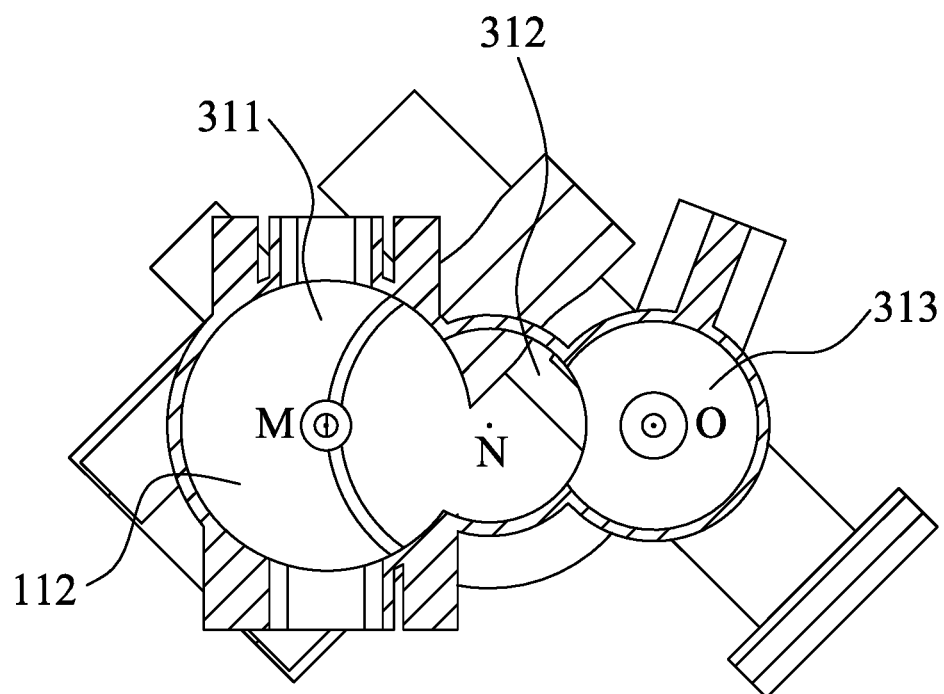
FIG. 3F is a cross-sectional view of the housing body shown in FIG. 2 taken along a section line C-C in FIG. 3A.

FIG. 3F is a cross-sectional view of the housing body 202 shown in FIG. 2 taken along a parallel direction of a section line C-C in FIG. 3A, showing the shape of the first cavity 112 more clearly. As shown in FIG. 3F, the first cavity 112 is substantially in the shape of three intersecting cylinders, thereby forming a first cut cylindrical cavity 311, a second cut cylindrical cavity 312, and a third cut cylindrical cavity 313. The first valve body 132 and the second valve body 134 are disposed in the first cut cylindrical cavity 311. The actuating shaft 118 is disposed in the second cut cylindrical cavity 312. The fourth valve body 138 is disposed in the third cut cylindrical cavity 313. The central axis M of the first cut cylindrical cavity 311 coincides with the first axis X. The central axis N of the second cut cylindrical cavity 312 coincides with the third axis Z. The central axis O of the third cut cylindrical cavity 313 coincides with the second axis Y.

It can be seen with reference to FIGS. 3A-3E that the wall of the first cavity 112 is provided with a first group of flow ports including a first flow port 361 arranged in the third direction and a second flow port 362 arranged reversely in the third direction. The first flow port 361 and the second flow port 362 are arranged at the same height in the first direction, and the height of the first flow port 361 and the second flow port 362 is set to enable the first flow port 361 and the second flow port 362 to cooperate with the first valve body 132. In other words, when the first valve body 132 rotates, the first valve body 132 can selectively connect or disconnect the first flow port 361 and/or the second flow port 362.

The first group of flow ports further includes a third flow port 363. The third flow port 363 is arranged within the range of an included angle between the reverse direction of the second direction and the third direction, and the height of the third flow port is lower than that of the first flow port 361 and the second flow port 362 in the first direction. The height of the third flow port 363 is set to enable the third flow port 363 to cooperate with the second valve body 134. In other words, when the second valve body 134 rotates, the second valve body 134 can selectively connect or disconnect the third flow port 363.

The first group of flow ports further include a fourth flow port 364. The fourth flow port 364 is arranged within the range of an included angle between the reverse direction of the second direction and the reverse direction of the third direction, and is slightly lower than the third flow port 363 in the first direction. The height of the fourth flow port 364 is lower than that of the second valve body 134. In other words, regardless of the angle to which the second valve body 134 rotates, the fourth flow port 364 remains fluidly connecting the first cavity 112.

Each of the first flow port 361, the second flow port 362, the third flow port 363, and the fourth flow port 364 is provided on the wall (i.e., the housing 101) of the first cut cylindrical cavity 311 around the central axis M of the first cut cylindrical cavity 311.

The first group of flow ports further include a fifth flow port 365, which is arranged within the range of an included angle between the reverse direction of the third direction and the second direction, and the height of the fifth flow port is slightly lower than that of the second flow port 362 in the first direction. The height of the fifth flow port 365 is set to enable the fifth flow port 365 to cooperate with the fourth valve body 138. In other words, when the fourth valve body 138 rotates, the fourth valve body 138 can selectively connect or disconnect the fifth flow port 365. In addition, the fifth flow port 365 is provided on the wall of the third cut cylindrical cavity 313 around the central axis O of the third cut cylindrical cavity 313.

Each of the first flow port 361, the second flow port 362, the third flow port 363, the fourth flow port 364, and the fifth flow port 365 is provided with a pipe that surrounds the flow port and extends outward from the housing body 202, such that each flow port can be connected to other devices or pipes through the pipe.

Figure 3G:
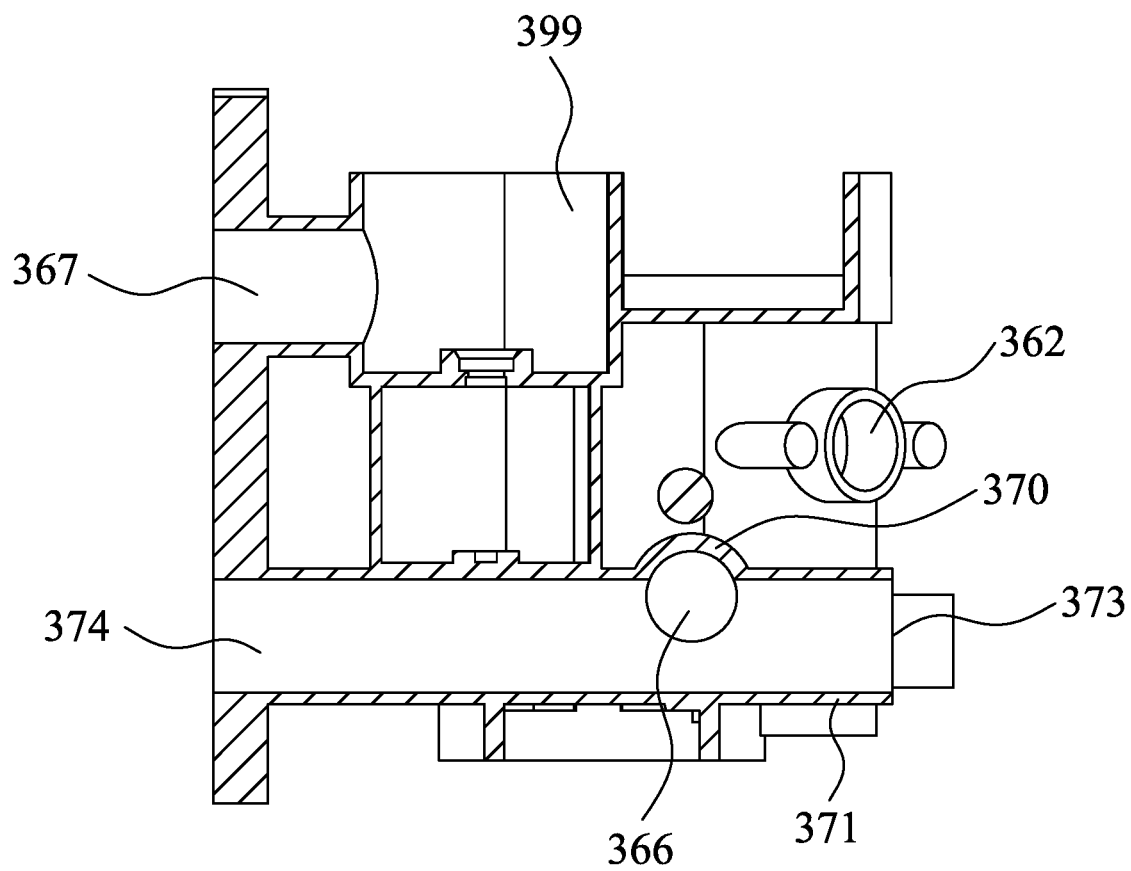
FIG. 3G is a cross-sectional view of the housing body shown in FIG. 2 taken along a section line D-D in FIG. 3D.

FIG. 3G is a cross-sectional view of the housing body 202 shown in FIG. 2 taken along a section line D-D in FIG. 3D, showing the specific arrangement of a sixth flow port 366. As shown in FIG. 3G, the first group of flow ports further includes the sixth flow port 366. The sixth flow port 366 is arranged at the junction between the wall of the first cut cylindrical cavity 311 and the wall of the second cut cylindrical cavity 312. The sixth flow port 366 is arranged within the range of an included angle between the reverse direction of the third direction and the second direction, and the height of the sixth flow port is slightly lower than that of the second flow port 362 in the first direction. The height of the sixth flow port 366 is set to enable the sixth flow port 366 to cooperate with the second valve body 134. In other words, when the second valve body 134 rotates, the second valve body 134 can selectively connect or disconnect the sixth flow port 366.

With reference to FIG. 2, the pipe 370 is provided around the sixth flow port 366 and extends outward from the housing body 202. The orifice 375 of the pipe 370 is blocked by the cover 203, such that the fluid cannot flow into or out of the housing body 202 from the orifice 375. The housing body 202 further comprises a pipe 371 provided perpendicular to the pipe 370. The pipe 371 and the pipe 370 can fluidly be connected. In this way, the fluid flowing out of or into the housing body 202 through the sixth flow port 366 can flow through orifices 373, 374 of the pipe 371.

With continued reference to FIGS. 3A-3E, a second group of flow ports are provided on the wall of the second cavity 114. The second group of flow ports include a seventh flow port 367 and an eighth flow port 368. The seventh flow port 367 is arranged within the range of an included angle between the second direction and the third direction, and is arranged to be higher than the fourth flow port 364 in the first direction. The eighth flow port 368 is arranged within the range of an included angle between the reverse direction of the third direction and the second direction, and the height of the eighth flow port is slightly lower than that of the seventh flow port 367 in the first direction. The heights of the seventh flow port 367 and the eighth flow port 368 are set to enable the seventh flow port 367 and the eighth flow port 368 to cooperate with the third valve body 136. In other words, when the third valve body 136 rotates, the third valve body 136 can selectively connect or disconnect the seventh flow port 367 and/or the eighth flow port 368.

Each of the seventh flow port 367 and the eighth flow port 368 is provided with a pipe that surrounds the flow port and extends outward from the housing body 202, such that each flow port can be connected to other devices or pipes through the pipe.

The second group of flow ports further include a pump outlet flow port 369. The pump outlet flow port 369 is provided on the vertical partition plate 324 for connecting with a pump outlet (not shown). Specifically, the pump outlet flow port 369 is arranged within the range of an included angle between the reverse direction of the second direction and the reverse direction of the third direction, and the height of the pump outlet flow port 369 is set to enable the pump outlet flow port 369 to cooperate with the third valve body 136. In other words, when the third valve body 136 rotates, the third valve body 136 can selectively connect or disconnect the pump outlet flow port 369.

As an example, the regulating valve 100 in the present disclosure uses a pump (not shown) as a power source for fluid flow. As shown in FIG. 3A, the second transversal partition plate 323 at the top of the first cavity 112 is provided with a plurality of through holes 342 for connecting with an inlet of the pump. An opening 399 at the top of the second cavity 114 can be covered by the pump. In this way, the fluid in the first cavity 112 can flow out of the housing 101 through a plurality of holes 242 and enter the pump, and then the fluid flowing out through the pump outlet can enter the second cavity 114 through the pump outlet flow port 369.

As an example, the actuator (not shown) is used as a power source for the rotation of the actuating shaft 118 in the present disclosure. As shown in FIG. 3B, the bottom of the first cavity 112 has a circular hole 303 for disposing the actuator. The actuator can be connected to the actuating shaft 118 through the hole 303 to drive the actuating shaft 118 to rotate.

Figure 4A:
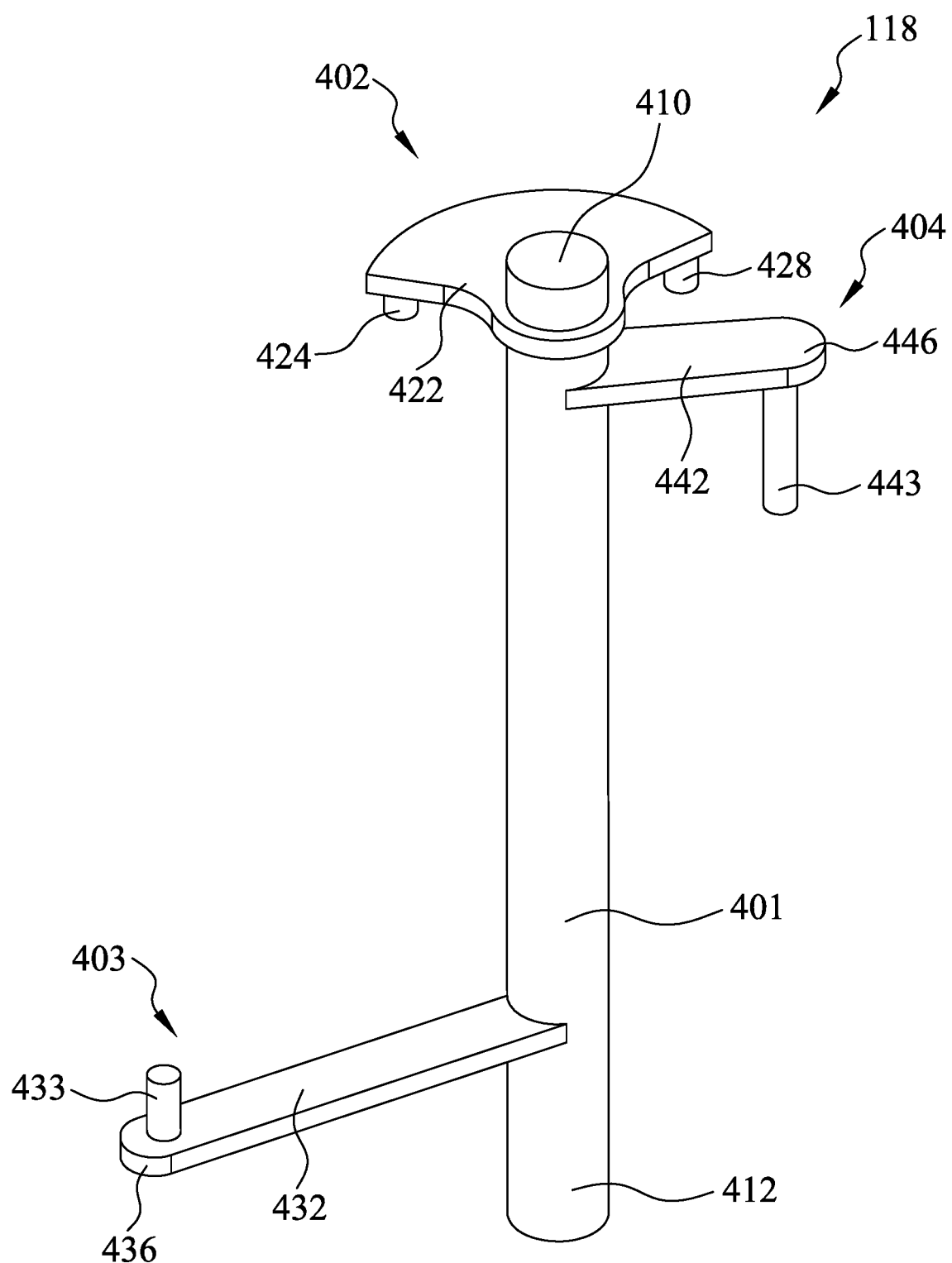
FIG. 4A is a perspective view of an actuating shaft shown in FIG. 1B as viewed from top to bottom.
Figure 4B:
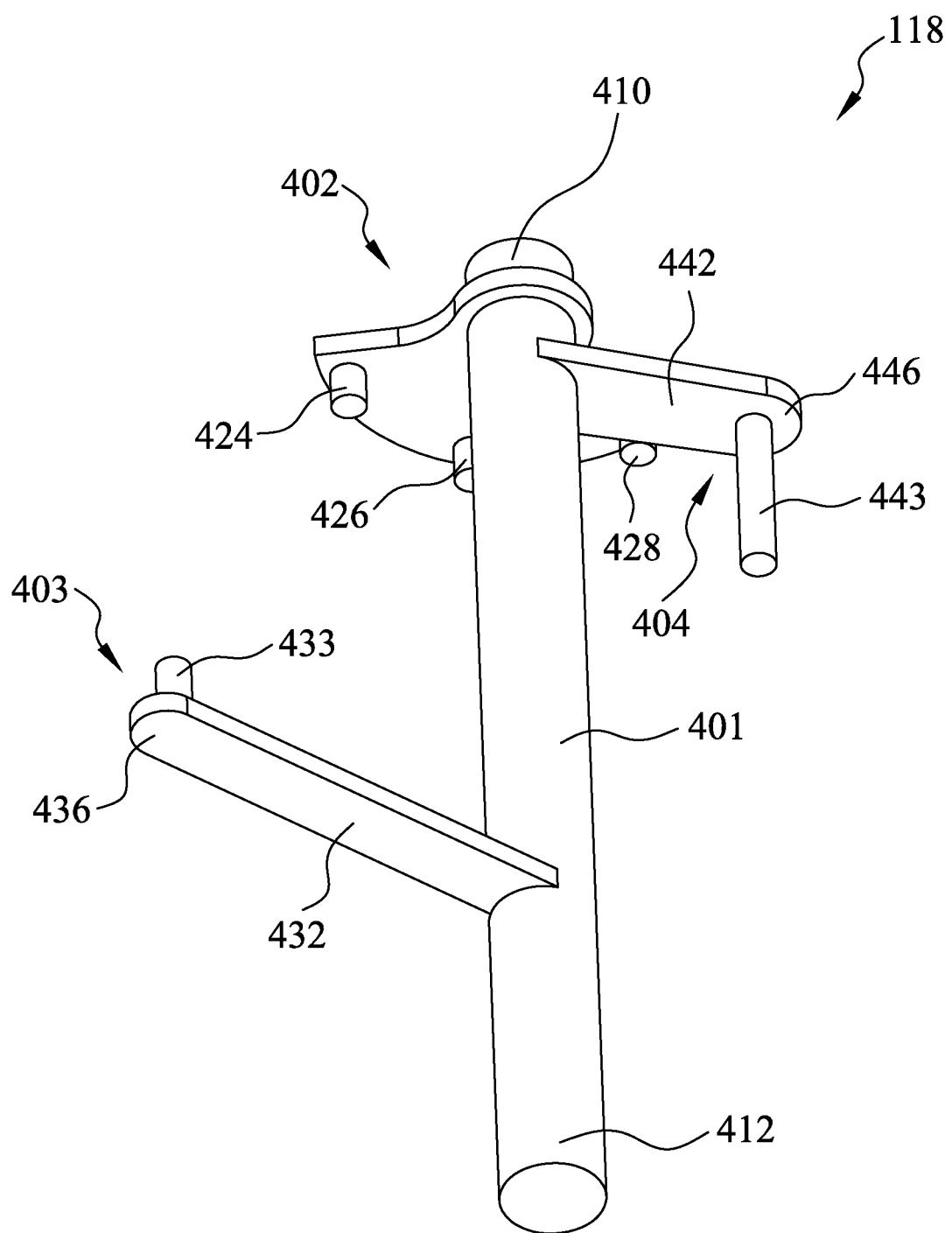
FIG. 4B is a perspective view of the actuating shaft shown in FIG. 1B as viewed from bottom to top.

FIG. 4A is a perspective view of the actuating shaft 118 shown in FIG. 1B as viewed from top to bottom at an angle. FIG. 4B is a perspective view of the actuating shaft shown in FIG. 1B as viewed from bottom to top at another angle. As shown in FIGS. 4A and 4B, the actuating shaft 118 comprises a shaft rod 401. An upper end 410 of the shaft rod 401 is designed to cooperate with the concave portion 394 in the housing body 202, such that the shaft rod 401 can be rotatably connected to the housing 101. A lower end 412 of the shaft rod 401 is designed to cooperate with an output end of the actuator, such that the actuator can drive the actuating shaft 118 to rotate during operation.

The regulating valve 100 comprises a first engageable and disengageable actuating structure 402, a second engageable and disengageable actuating structure 403, and a third engageable and disengageable actuating structure 404 that are provided on the shaft rod 401. Specifically, the first engageable and disengageable actuating structure 402 is provided at an upper portion of the shaft rod 401. The first engageable and disengageable actuating structure 402 comprises a first transversal plate 422 and a plurality of first rods 424, 426, 428. The first transversal plate 422 is substantially sector-shaped, and is transversely provided at the upper portion of the shaft rod 401, such that a circumferential direction of the sector is identical to a circumferential direction of the shaft rod 401. The center of a circle of the sector on the axis of the shaft lever 401, such that when the actuating shaft 118 rotates about the first axis X, the plurality of first rods 424, 426, 428 on the first transversal plate 422 can also rotate about the first axis X. The plurality of first rods 424, 426, 428 are uniformly provided near an outer edge of the first transversal plate 422 along a circumferential direction of the first transversal plate 422, and extend downward from a bottom surface of the first transversal plate 422. The plurality of first rods 424, 426, 428 are provided to cooperate with a first engageable and disengageable actuated structure 555 on the first valve body 132, such that when the actuating shaft 118 rotates within a first angle range, the first engageable and disengageable actuating structure 402 (i.e., at least one of the plurality of first rods 424, 426, 428) on the actuating shaft 118 can drive the first valve body 132 to rotate together.

The second engageable and disengageable actuating structure 403 comprises a second transversal arm 432 and a second rod 433. The second transversal arm 432 is substantially elongated, and extends perpendicularly from the shaft rod 401 in a radial direction of the shaft rod 401, such that when the shaft rod 401 rotates, a distal end 436 of the second transversal arm 432 can move in the circumferential direction. The second rod 433 is provided at the distal end 436 of the second transversal arm 432 and extends upward from an upper surface of the second transversal arm 432. The second rod 433 is provided to cooperate with a second engageable and disengageable actuated structure 755 on the second valve body 134, such that when the actuating shaft 118 rotates within a second angle range, the second engageable and disengageable actuating structure 403 (i.e., the second rod 433) on the actuating shaft 118 can drive the second valve body 134 to rotate together.

The third engageable and disengageable actuating structure 404 comprises a third transversal arm 442 and a third rod 443. The third transversal arm 442 is substantially elongated, and extends perpendicularly from the upper portion of the shaft rod 401 in the radial direction of the shaft rod 401, such that when the shaft rod 401 rotates, a distal end 446 of the third transversal arm 442 can move in the circumferential direction. The third rod 443 is provided at the distal end 446 of the third transversal arm 442 and extends downward from a lower surface of the third transversal arm 442. The third rod 443 is provided to cooperate with a third engageable and disengageable actuated structure 955 on the third valve body 136 and a fourth engageable and disengageable actuated structure 1155 on the fourth valve body 138, such that when the actuating shaft 118 rotates within a third angle range, the third engageable and disengageable actuating structure 404 (i.e., the third rod 443) on the actuating shaft 118 can drive the third valve body 136 to rotate; and when the actuating shaft 118 rotates within a fourth angle range, the third engageable and disengageable actuating structure 404 (i.e., the third rod 443) on the actuating shaft 118 can drive the fourth valve body 138 to rotate.

Figure 5A:
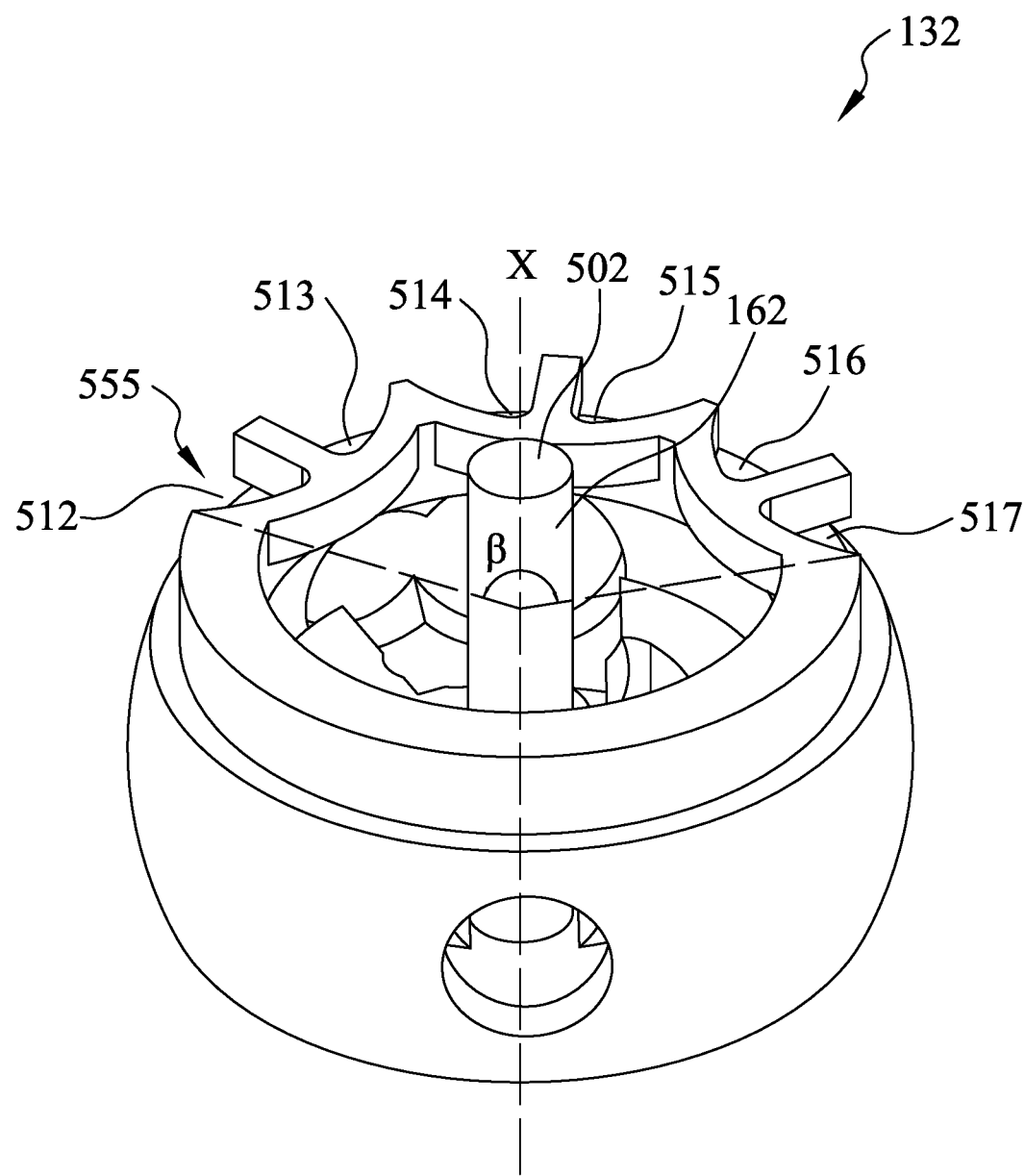
FIG. 5A is a perspective view of a first valve body shown in FIG. 1B as viewed from top to bottom.
Figure 5B:
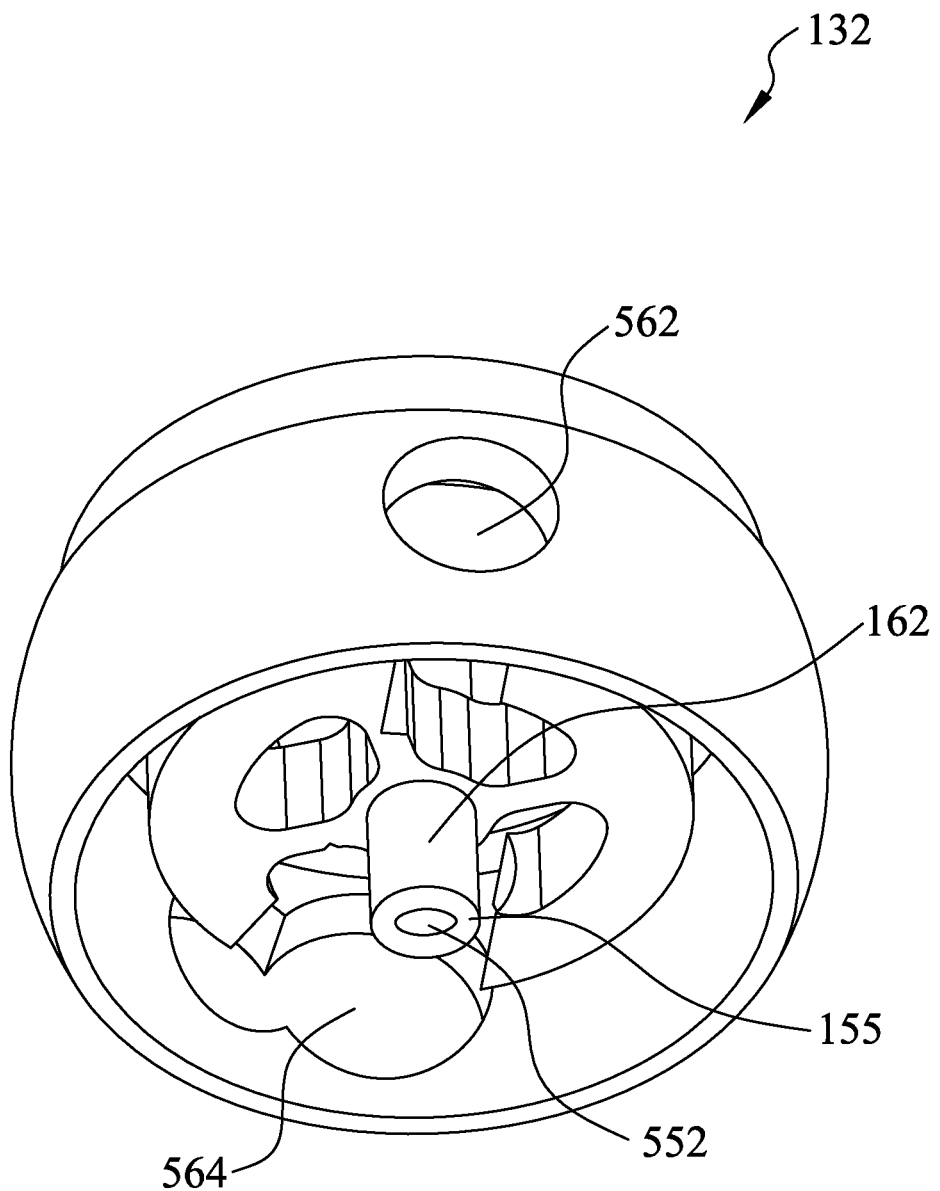
FIG. 5B is a perspective view of the first valve body shown in FIG. 1B as viewed from bottom to top.

FIG. 5A is a perspective view of the first valve body 132 shown in FIG. 1B as viewed from top to bottom. FIG. 5B is a perspective view of the first valve body 132 shown in FIG. 1B as viewed from bottom to top. As shown in FIGS. 5A and 5B, the first valve body 132 is substantially a sphere with upper and lower portions cut, and has the rotating shaft 162. A lower portion of the rotating shaft 162 is provided with a recess 552 to form the sleeve 155. The sleeve 155 is used to receive an upper end of the rotating shaft 164 of the second valve body 134, such that the first valve body 132 and the second valve body 134 can rotate about the same first axis X. An upper portion 502 of the first valve body 132 is designed to cooperate with the concave portion 393 of the second transversal partition plate 323, such that the upper portion 502 of the first valve body 132 can be received by the concave portion 393.

The sphere of the first valve body 132 is provided with the first engageable and disengageable actuated structure 555. The first engageable and disengageable actuated structure 555 includes a plurality of first grooves 512, 513, 514, 515, 516, 517. The plurality of first grooves 512, 513, 514, 515, 516, 517 are provided on an upper surface of the sphere of the first valve body 132, and are arranged along a circumferential direction of the first valve body 132. Specifically, the plurality of first grooves 512, 513, 514, 515, 516, 517 are formed by grooving from an edge of the sphere of the first valve body 132 to the inside of the sphere, and the central angle formed by the distribution of the plurality of first grooves 512, 513, 514, 515, 516, 517 on the sphere of the first valve body 132 is β.

The first valve body 132 is provided with two openings 562, 564, and the two openings 562, 564 are configured such that when the first valve body 132 rotates, at least one of the two openings 562, 564 can be selectively aligned with the first flow port 361 and/or the second flow port 362 on the wall of the first cavity 112, to respectively connect and disconnect the first flow port 361 and the second flow port 362.

Figure 6:
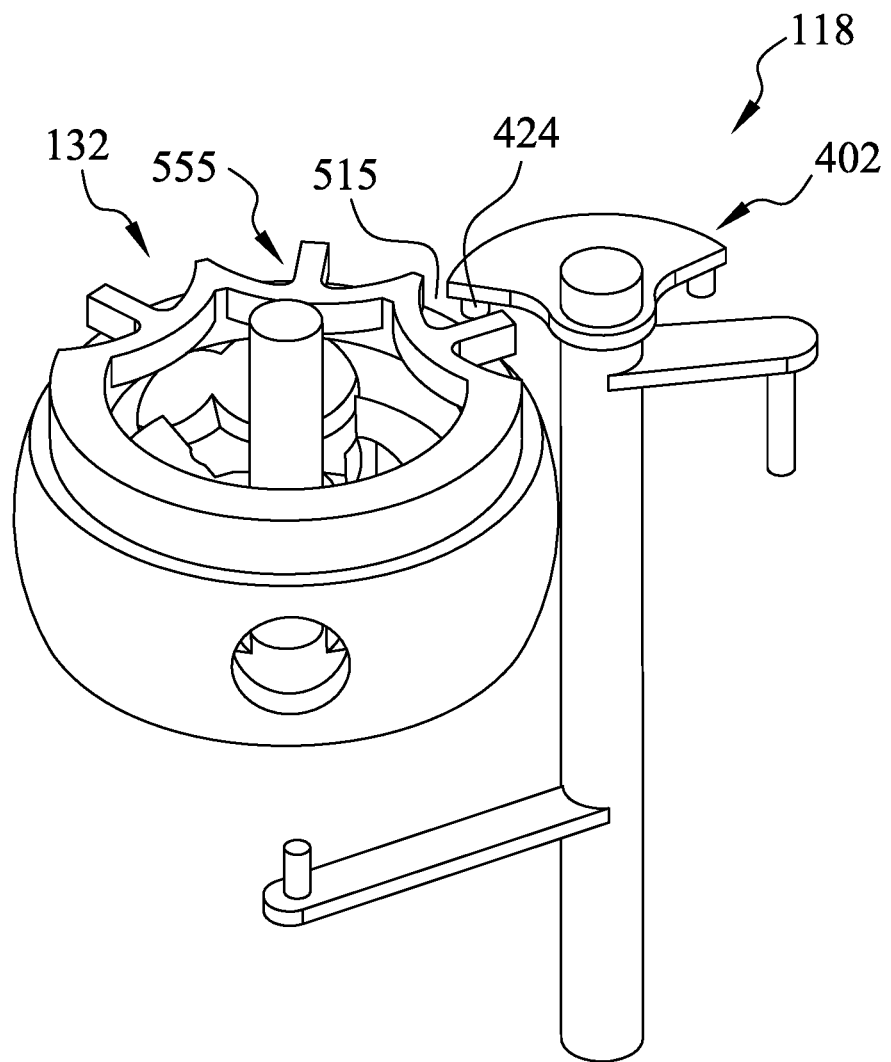
FIG. 6 is a schematic view of a cooperation relationship between the first valve body and the actuating shaft.

FIG. 6 is a schematic view of a cooperation relationship between the first valve body 132 and the actuating shaft 118, exemplarily showing one of the states when the first engageable and disengageable actuating structure 402 engages with the first engageable and disengageable actuated structure 555. As shown in FIG. 6, when the actuating shaft 118 rotates within the first angle range, at least one of the plurality of first rods 424, 426, 428 on the actuating shaft 118 can engage with at least one of the plurality of first grooves 512, 513, 514, 515, 516, 517. Thereby, the actuating shaft 118 can drive the first valve body 132 to rotate.

It should be noted that the first valve body 132 is sleeved on the second valve body 134, but due to the friction between the first valve body 132 and the second valve body 134, when the first valve body 132 rotates, the second valve body 134 does not rotate with the first valve body 132.

Figure 7A:
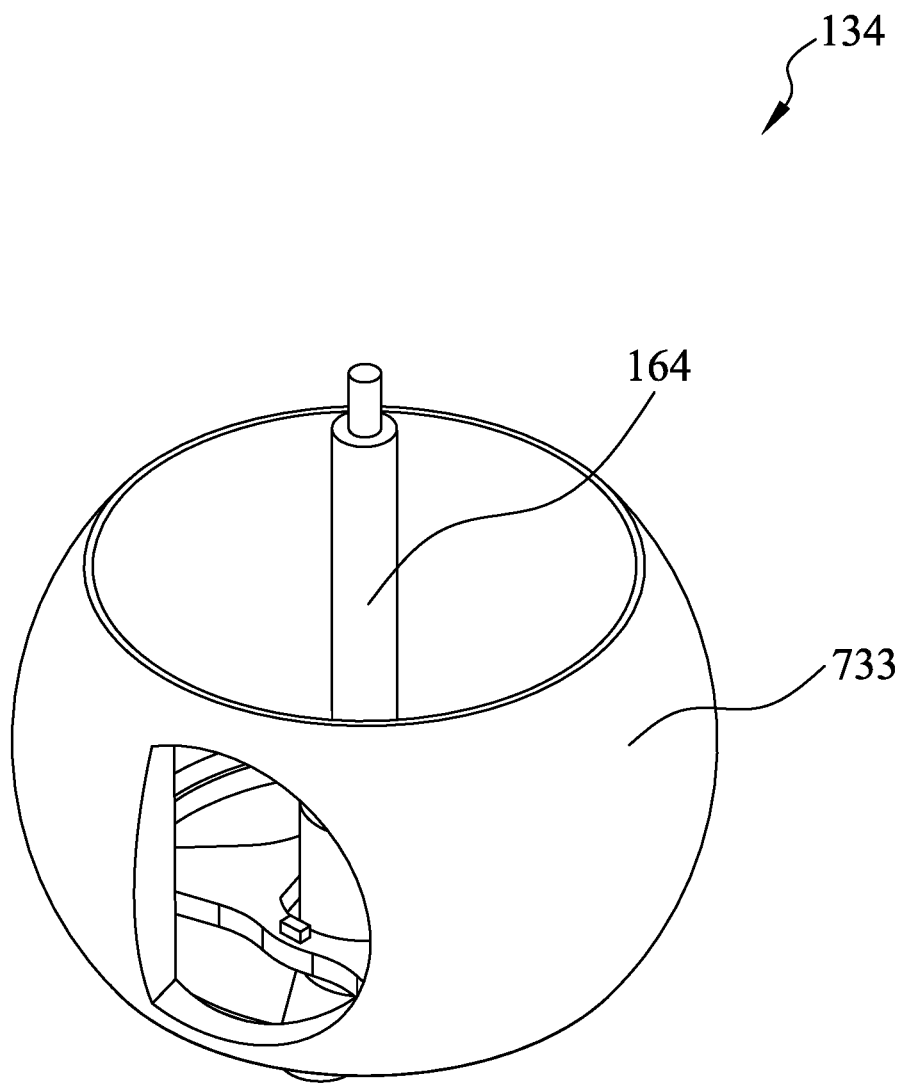
FIG. 7A is a perspective view of a second valve body shown in FIG. 1B as viewed from top to bottom.
Figure 7B:
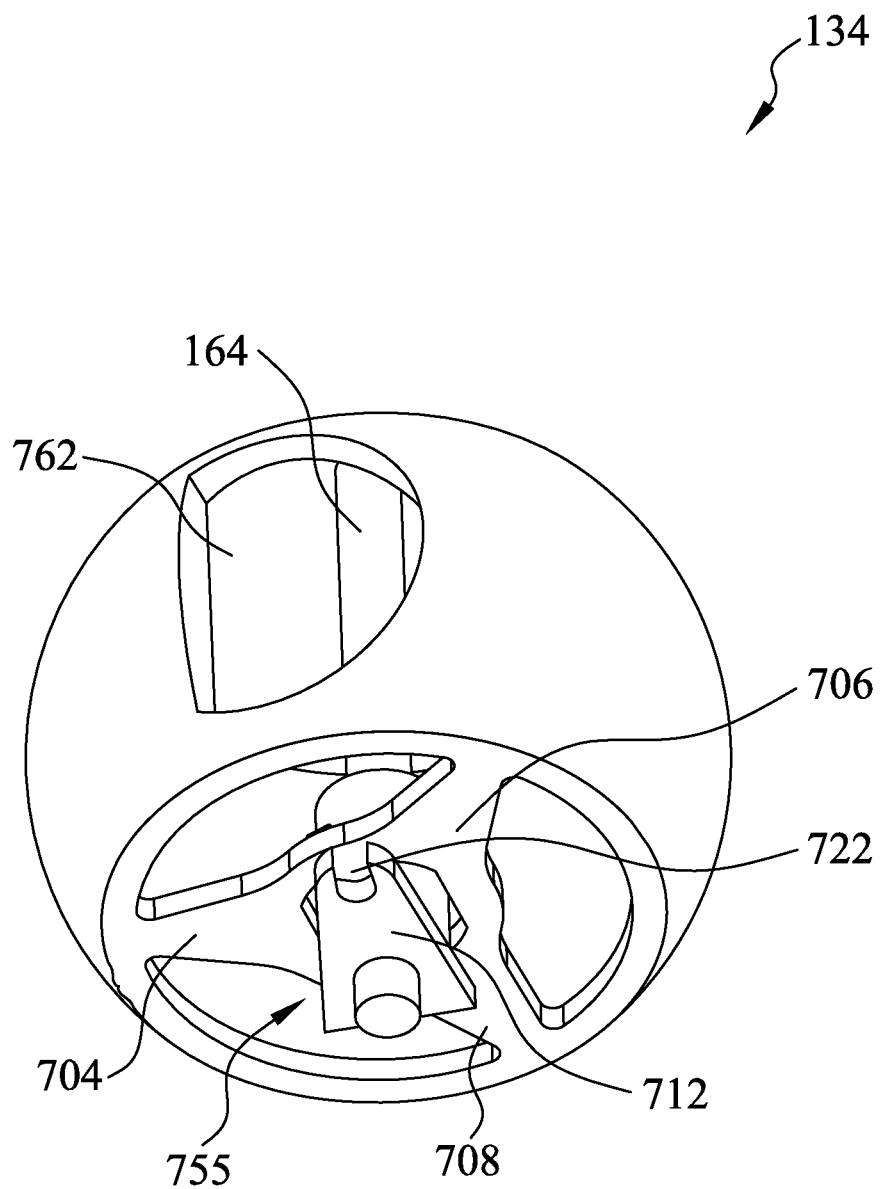
FIG. 7B is a perspective view of the second valve body shown in FIG. 1B as viewed from bottom to top.

FIG. 7A is a perspective view of the second valve body 134 shown in FIG. 1B as viewed from top to bottom. FIG. 7B is a perspective view of the second valve body 134 shown in FIG. 1B as viewed from bottom to top. As shown in FIGS. 7A and 7B, the second valve body 134 comprises a second valve body main body 733 and the rotating shaft 164. The top of the rotating shaft 164 is stepped, and can be received by the sleeve 155 at the lower portion of the first valve body 132, such that the first valve body 132 and the second valve body 134 can rotate about the same first axis X.

The second valve body main body 733 is substantially a spherical shell with upper and lower portions cut, and the second valve body main body 733 is disposed around the rotating shaft 164. A lower portion of the second valve body main body 733 is fixedly connected to the rotating shaft 164 via a plurality of connecting posts 704, 706, 708. The second valve body main body 733 is provided with an opening 762, and the opening 762 is configured such that when the second valve body 134 rotates, the opening 762 can be selectively aligned with the third flow port 363 and/or the sixth flow port 366 on the wall of the first cavity 112, to connect and disconnect the third flow port 363 and the sixth flow port 366.

A second engageable and disengageable actuated structure 755 is provided at the lower portion of the rotating shaft 164. The second engageable and disengageable actuated structure 755 comprises a second valve body plate 712. One end of the second valve body plate 712 is connected to the lower portion of the rotating shaft 164, the other end of the second valve body plate 712 is provided with a second groove 722. The second groove 722 is arranged in a radial direction of the second valve body 134. When the actuating shaft 118 rotates within the second angle range, the second rod 433 on the actuating shaft 118 can engage with the second groove 722 on the second valve body 134.

Figure 8:
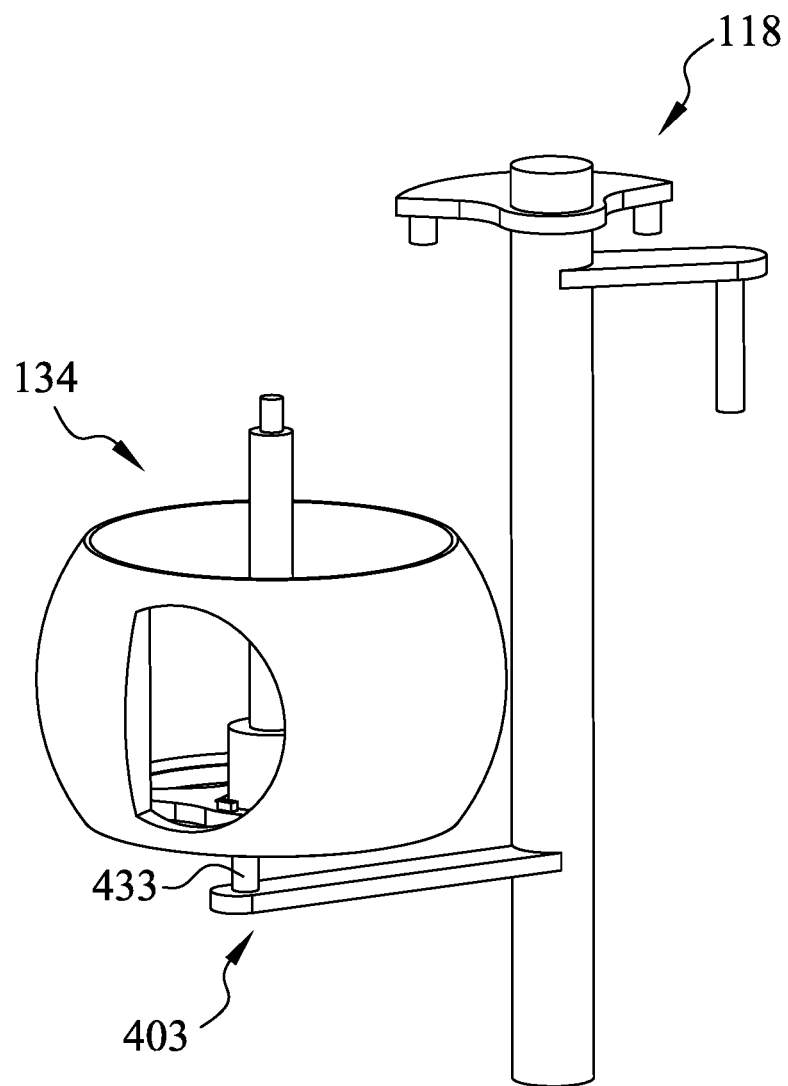
FIG. 8 is a schematic view of a cooperation relationship between the second valve body and the actuating shaft.

FIG. 8 is a schematic view of a cooperation relationship between the second valve body 134 and the actuating shaft 118, exemplarily showing one of the states when the second engageable and disengageable actuating structure 403 engages with the second engageable and disengageable actuated structure 755. As shown in FIG. 8, when the actuating shaft 118 rotates within the second angle range, the second rod 433 on the actuating shaft 118 engages with the second groove 722. Thereby, the actuating shaft 118 can drive the second valve body 134 to rotate within the second angle range.

It should be noted that the first valve body 132 is sleeved on the second valve body 134, but due to the friction between the first valve body 132 and the second valve body 134, when the second valve body 134 rotates, the first valve body 132 does not rotate with the rotation of the second valve body 134.

Figure 9A:
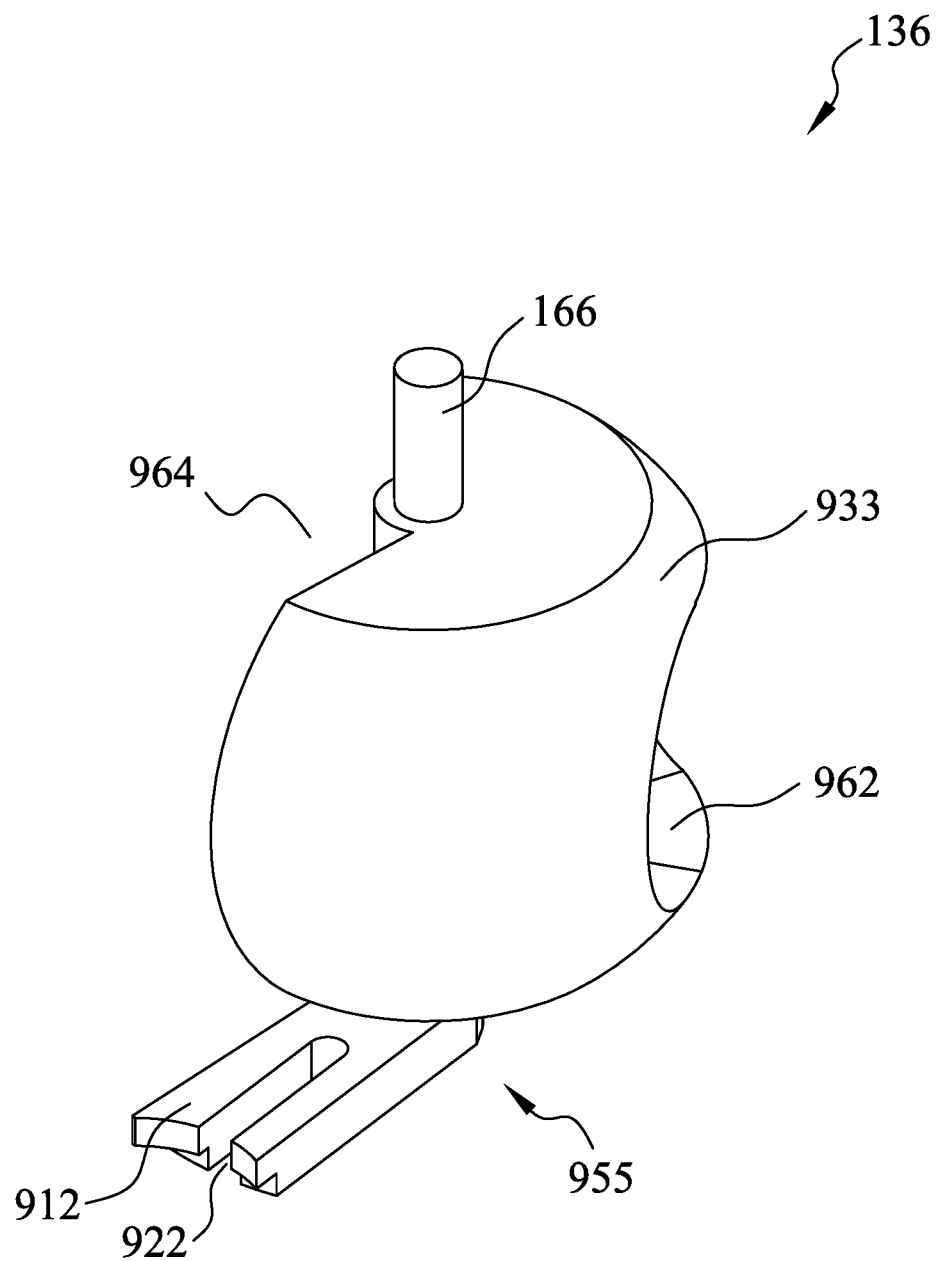
FIG. 9A is a perspective view of a third valve body shown in FIG. 1B as viewed from top to bottom.
Figure 9B:
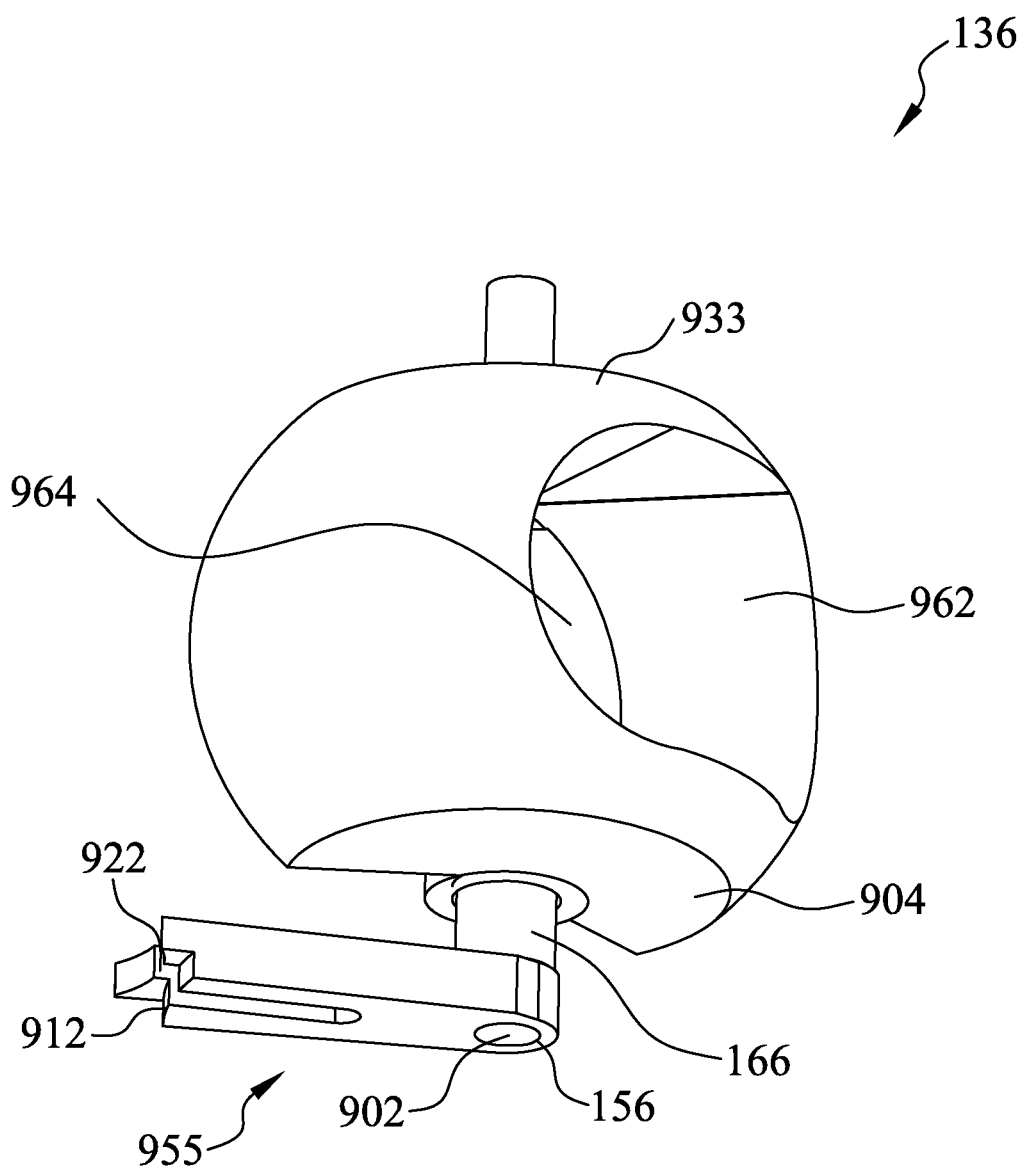
FIG. 9B is a perspective view of the third valve body shown in FIG. 1B as viewed from bottom to top.

FIG. 9A is a perspective view of the third valve body 136 shown in FIG. 1B as viewed from top to bottom at an angle. FIG. 9B is a perspective view of the third valve body 136 shown in FIG. 1B as viewed from bottom to top at another angle. As shown in FIGS. 9A and 9B, the third valve body 136 comprises a third valve body main body 933 and the rotating shaft 166. The top of the rotating shaft 166 is received by a connecting portion provided on the pump. The lower portion of the rotating shaft 166 is provided with a recess 902 to form the sleeve 156. The sleeve 156 is used to receive an upper end of the rotating shaft 168 of the fourth valve body 138, such that the third valve body 136 and the fourth valve body 138 can rotate about the same second axis Y.

The third valve body main body 933 is substantially in the shape of a spherical shell, and is disposed around the rotating shaft 166. The lower portion of the third valve body main body 933 are fixedly connected to the rotating shaft 166 via a connecting plate 904. The third valve body main body 933 is provided with two openings 962, 964. The two openings 962, 964 are configured such that when the third valve body 136 rotates, at least one of the two openings 962, 964 can be selectively aligned with the pump outlet flow port 369, the seventh flow port 367 and/or the eighth flow port 368 on the wall of the second cavity 114, in order to connect and disconnect the pump outlet flow port 369, the seventh flow port 367 and the eighth flow port 368.

A third engageable and disengageable actuated structure 955 is provided at the lower portion of the rotating shaft 166. The third engageable and disengageable actuated structure 955 comprises a third valve body plate 912. One end of the third valve body plate 912 is connected to the lower portion of the rotating shaft 166, the other end of the third valve body plate 912 is provided with a third groove 922. The third groove 922 is arranged in a radial direction of the third valve body 136. When the actuating shaft 118 rotates within the third angle range, the third rod 443 on the actuating shaft 118 can engage with the third groove 922 on the third valve body 136.

Figure 10:
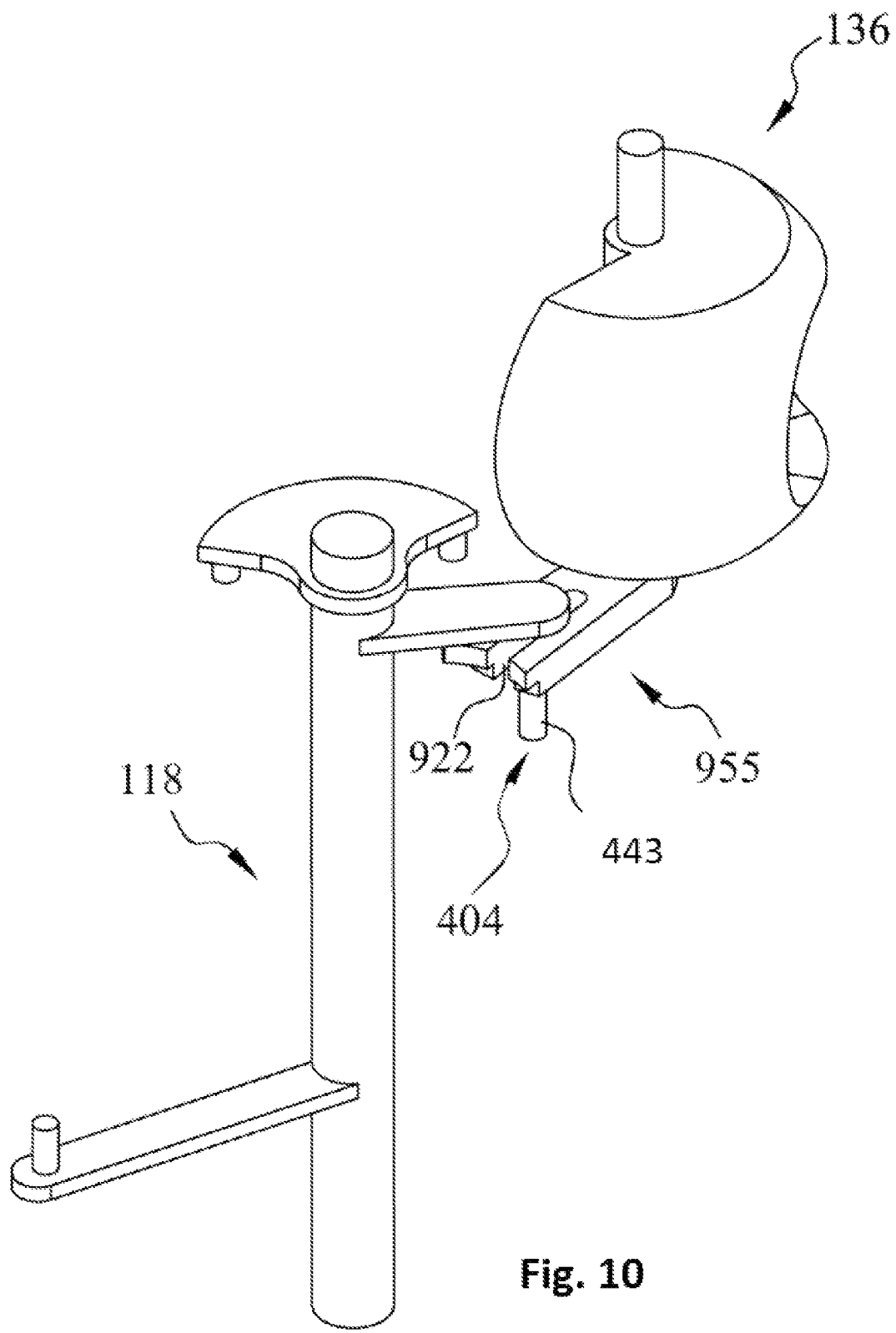
FIG. 10 is a schematic view of a cooperation relationship between the third valve body and the actuating shaft.

FIG. 10 is a schematic view of a cooperation relationship between the third valve body 136 and the actuating shaft 118, exemplarily showing one of the states when the third engageable and disengageable actuating structure 404 engages with the third engageable and disengageable actuated structure 955. As shown in FIG. 10, when the actuating shaft 118 rotates within the third angle range, the third rod 443 on the actuating shaft 118 engages with the third groove 922 on the third valve body 136. Thereby, the actuating shaft 118 can drive the third valve body 136 to rotate within the third angle range.

It should be noted that the third valve body 136 is sleeved on the fourth valve body 138, but due to the friction between the third valve body 136 and the fourth valve body 138, when the third valve body 136 rotates, the fourth valve body 138 does not rotate with the rotation of the second valve body 134.

Figure 11A:
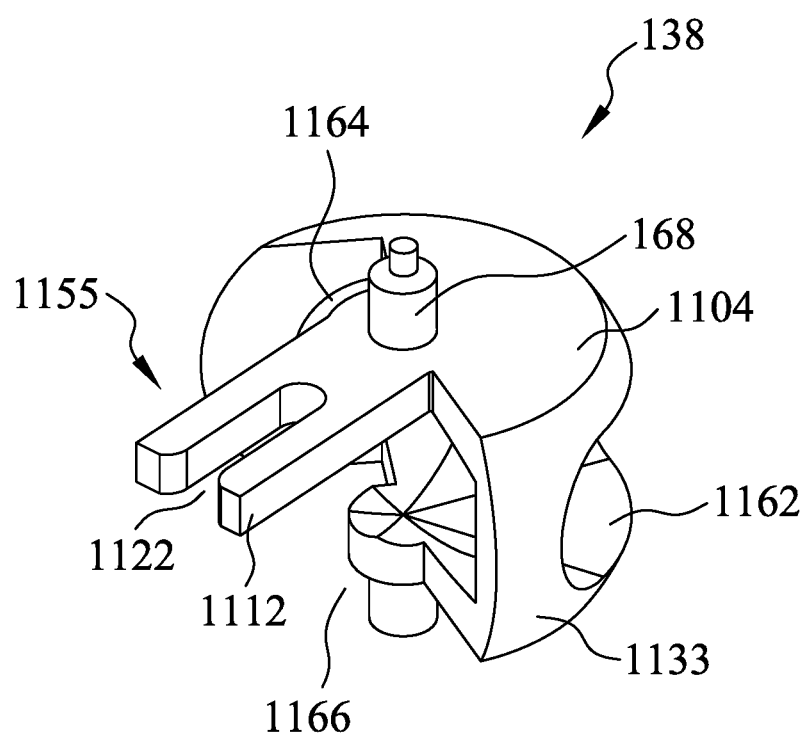
FIG. 11A is a perspective view of a fourth valve body shown in FIG. 1B as viewed from top to bottom at an angle.
Figure 11B:
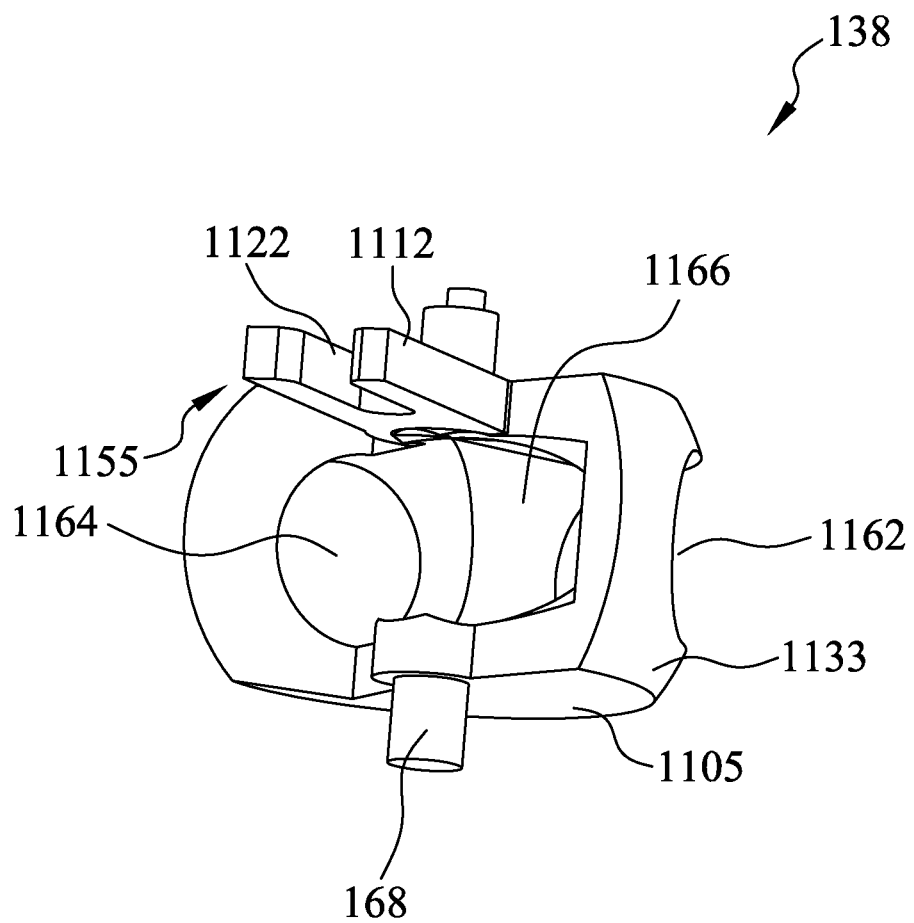
FIG. 11B is a perspective view of the fourth valve body shown in FIG. 1B as viewed from bottom to top at another angle.

FIG. 11A is a perspective view of the fourth valve body 138 shown in FIG. 1B as viewed from top to bottom at an angle. FIG. 11B is a perspective view of the fourth valve body 138 shown in FIG. 1B as viewed from bottom to top at another angle. As shown in FIGS. 11A and 11B, the fourth valve body 138 comprises a fourth valve body main body 1133 and the rotating shaft 168. The top of the rotating shaft 166 is stepped, such that the top of the rotating shaft 166 can be received by the sleeve 156 at the lower portion of the third valve body 136, and the third valve body 136 and the fourth valve body 138 can rotate about the same second axis Y.

The fourth valve body main body 1133 is substantially in the shape of a spherical shell, and is provided around the rotating shaft 168. Connecting plates 1104, 1105 are respectively provided at an upper portion and a lower portion of the fourth valve body main body 1133 and are fixedly connected to the rotating shaft 168. The fourth valve body main body 1133 is provided with three openings 1162, 1164, 1166, and the three openings 1162, 1164, 1166 are configured such that when the fourth valve body 138 rotates, at least one of the three openings 1162, 1164, 1166 can be selectively aligned with the fourth flow port 364 on the wall of the first cavity 112, to connect and disconnect the fourth flow port 364.

A fourth engageable and disengageable actuated structure 1155 is provided at an upper portion of the rotating shaft 168. The fourth engageable and disengageable actuated structure 1155 comprises a fourth valve body plate 1112. One end of the fourth valve body plate 1112 is connected to the upper portion of the rotating shaft 168, the other end of the fourth valve body plate 1112 is provided with a fourth groove 1122, and the fourth groove 1122 is arranged in a radial direction of the fourth valve body 138. When the actuating shaft 118 rotates within the fourth angle range, the third rod 443 on the actuating shaft 118 can engage with the fourth groove 1122 on the fourth valve body 138.

Figure 12:
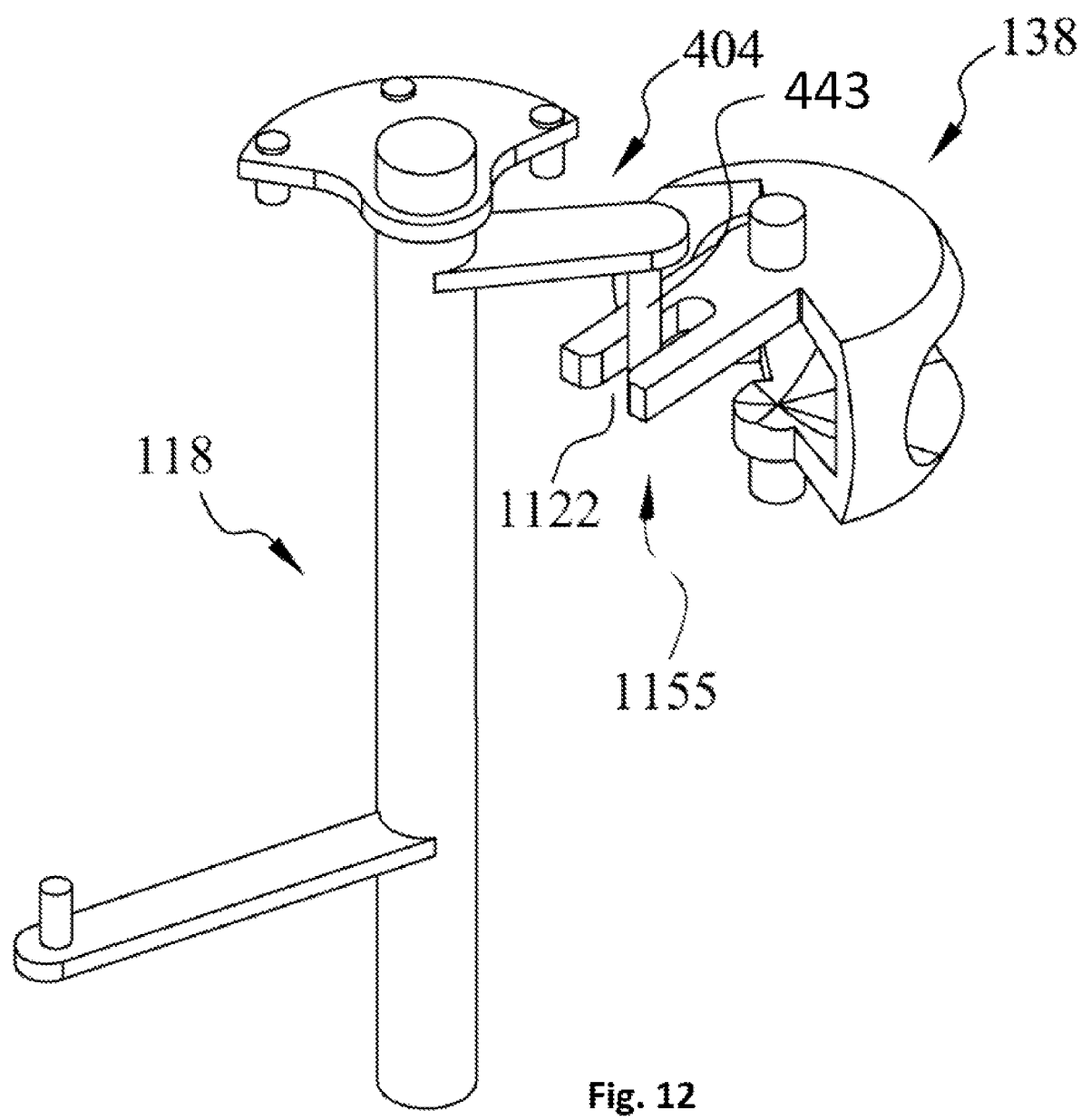
FIG. 12 is a schematic view of a cooperation relationship between the fourth valve body and the actuating shaft.

FIG. 12 is a schematic view of a cooperation relationship between the fourth valve body 138 and the actuating shaft 118, exemplarily showing one of the states when the third engageable and disengageable actuating structure 404 engages with the fourth engageable and disengageable actuated structure 1155. As shown in FIG. 12, when the actuating shaft 118 rotates within the fourth angle range, the third rod 443 on the actuating shaft 118 engages with the fourth groove 1122. Thereby, the actuating shaft 118 can drive the fourth valve body 138 to rotate within the fourth angle range.

It should be noted that the fourth valve body 138 is sleeved on the fourth valve body 138, but due to the friction between the third valve body 136 and the fourth valve body 138, when the fourth valve body 138 rotates, the third valve body 136 does not rotate with the rotation of the fourth valve body 138.

It should also be noted that, in the embodiment of the present disclosure, the third engageable and disengageable actuated structure 955 and the fourth engageable and disengageable actuated structure 1155 respectively cooperate with the third engageable and disengageable actuating structure 404 to form the third engaging and disengaging structure and the fourth engaging and disengaging structure. However, since groove walls on two sides of the third groove 922 and groove walls at two ends of the fourth groove 1122 are different in length, the moment for engagement and disengagement of the third engaging and disengaging structure and the fourth engaging and disengaging structure is also different. In the embodiment of the present disclosure, the third engaging and disengaging structure can be engaged when the actuating shaft 118 rotates within the third angle range, and the fourth engaging and disengaging structure can be engaged when the actuating shaft 118 rotates within the fourth angle range.

Since the first engaging and disengaging structure, the second engaging and disengaging structure, the third engaging and disengaging structure, and the fourth engaging and disengaging structure in the present disclosure substantially use the way of grooves and rods to achieve engagement and disengagement, in order to clearly illustrate the specific cooperation relationship in the engaging and disengaging structure, the third engaging and disengaging structure is taken as an example in the present disclosure for detailed description below.

FIGS. 13A-13H are schematic views of the third engaging and disengaging structure during operation, showing how the third engaging and disengaging structure achieves engagement and disengagement. Specifically, the third engaging and disengaging structure comprises the third engageable and disengageable actuating structure 404 and the third engageable and disengageable actuated structure 955. When the actuating shaft 118 rotates within the third angle range, the third engageable and disengageable actuating structure 404 can engage with the third engageable and disengageable actuated structure 955, so as to drive the third engageable and disengageable actuated structure 955 to rotate together. When the actuating shaft 118 rotates beyond the third angle range, the third engageable and disengageable actuating structure 404 is disengaged from the third engageable and disengageable actuated structure 955, so as not to drive the third engageable and disengageable actuated structure 955 to rotate. FIGS. 13A-13H schematically show the relative positional relationships among the shaft rod 401 of the actuating shaft 118, the third transversal arm 442, and the third rod 443. When the actuating shaft 118 rotates, the shaft rod 401, the third transversal arm 442, and the third rod 443 rotate together about the third axis Z. FIGS. 13A-13H also schematically show the relative positional relationships among the rotating shaft 166 of the third valve body 136, the third valve body plate 912, and the third groove 922. When the third valve body 136 rotates, the rotating shaft 166, the third valve body plate 912, and the third groove 922 rotate together about the second axis Y.

Figure 13A:
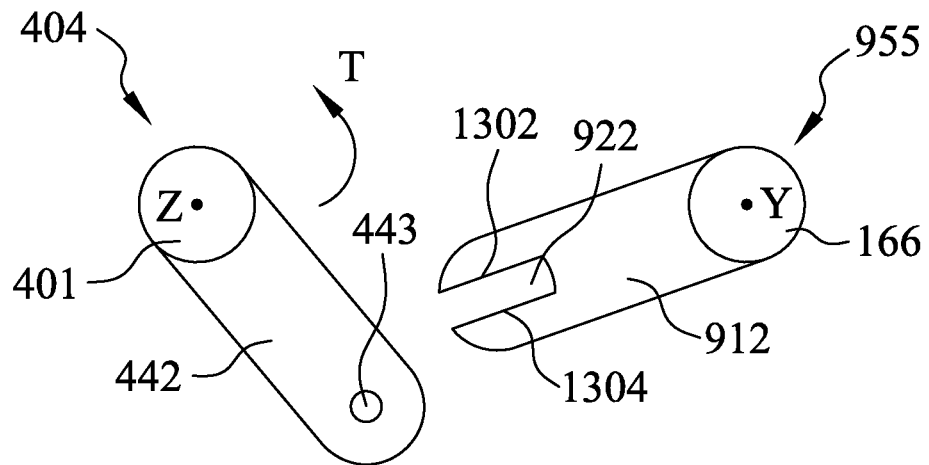
FIGS. 13A-13H are schematic views of a third engaging and disengaging structure during operation.

FIG. 13A shows the relative positional relationship between the third engageable and disengageable actuating structure 404 and the third engageable and disengageable actuated structure 955 when the actuating shaft 118 has not yet rotated to an initial angle of the third angle range. Specifically, the actuator drives the actuating shaft 118 to rotate counterclockwise (for example, as indicated by an arrow T in FIG. 13A), such that the third engageable and disengageable actuating structure 404 also rotates counterclockwise. The third engageable and disengageable actuated structure 955 stays in a first position because it is not driven by the actuator.

Figure 13B:
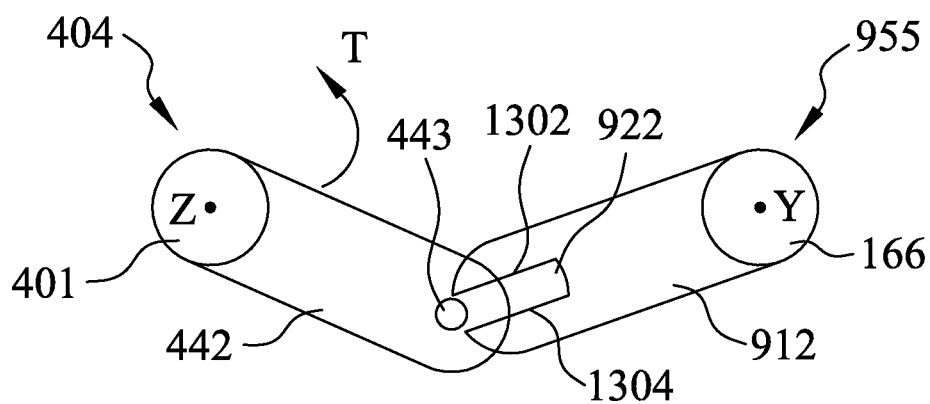

FIG. 13B shows the relative positional relationship between the third engageable and disengageable actuating structure 404 and the third engageable and disengageable actuated structure 955 when the actuating shaft 118 rotates to a first boundary angle of the third angle range. Specifically, when the actuating shaft 118 rotates counterclockwise to the initial angle of the third angle range, the third rod 443 of the actuating shaft 118 contacts a first side wall 1302 of the third groove 922, such that the third rod 443 is received in the third groove 922.

Figure 13C:
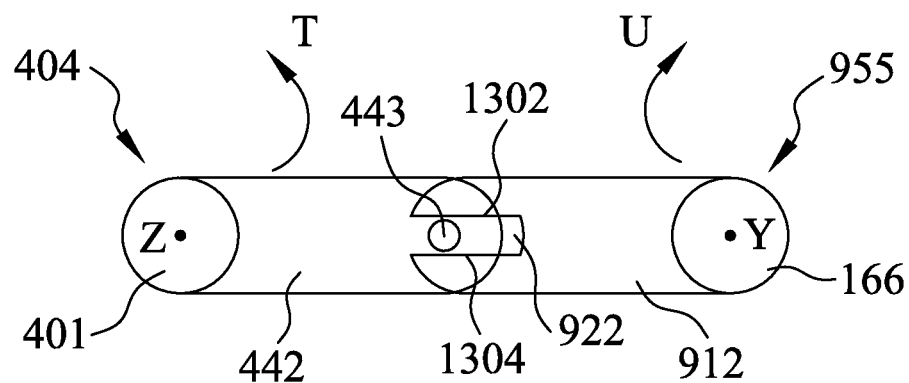

FIG. 13C shows the relative positional relationship between the third engageable and disengageable actuating structure 404 and the third engageable and disengageable actuated structure 955 when the actuating shaft 118 rotates counterclockwise within the third angle range. Specifically, when the actuating shaft 118 continues to rotate counterclockwise, the third rod 443 pushes the first side wall 1302 of the third groove 922, such that the third valve body plate 912 rotates. Thereby, the third engageable and disengageable actuating structure 404 drives the third engageable and disengageable actuated structure 955 to rotate clockwise (for example, as indicated by an arrow U in FIG. 13C).

Figure 13D:
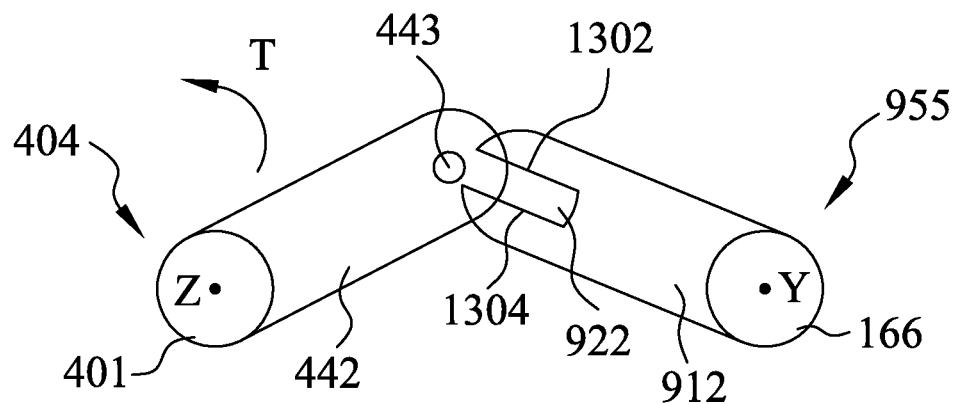
Figure 13E:
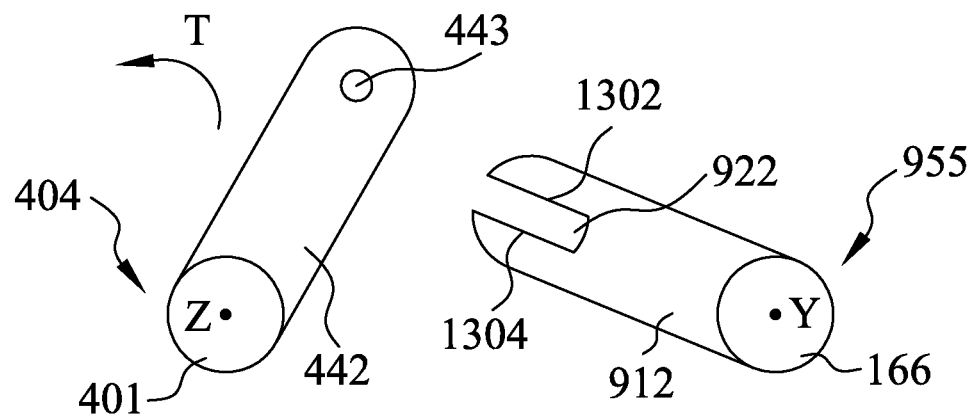

FIG. 13D shows that, when the actuating shaft 118 rotates to a second boundary angle of the third angle range, the third engageable and disengageable actuating structure 404 is disengaged from the third engageable and disengageable actuated structure 955. FIG. 13E shows that, when the actuating shaft 118 rotates beyond the third angle range, the third engageable and disengageable actuating structure 404 is disengaged from the third engageable and disengageable actuated structure 955. Specifically, when the actuating shaft 118 continues to rotate counterclockwise, the third rod 443 is disengaged from the third groove 922, such that the actuating shaft 118 continues to rotate counterclockwise while the third engageable and disengageable actuated structure 955 retains in a second position. That is, at this time, the third engageable and disengageable actuating structure 404 cannot drive the third engageable and disengageable actuated structure 955 to rotate.

Figure 13F:
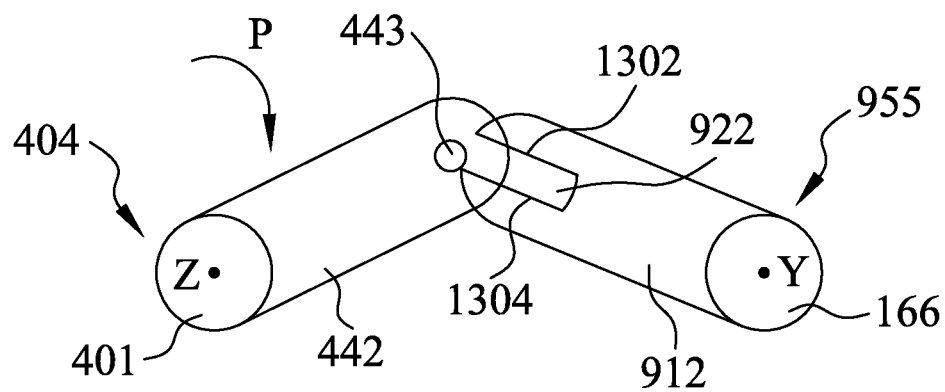

FIG. 13F shows the relative positional relationship between the third engageable and disengageable actuating structure 404 and the third engageable and disengageable actuated structure 955 when the actuating shaft 118 rotates to the second boundary angle of the third angle range. Specifically, when the actuating shaft 118 rotates clockwise (for example, as indicated by an arrow P in FIG. 13F), the third engageable and disengageable actuating structure 404 also rotates clockwise. The third rod 443 of the actuating shaft 118 contacts a second side wall 1304 of the third groove 922, such that the third rod 443 is received in the third groove 922.

Figure 13G:
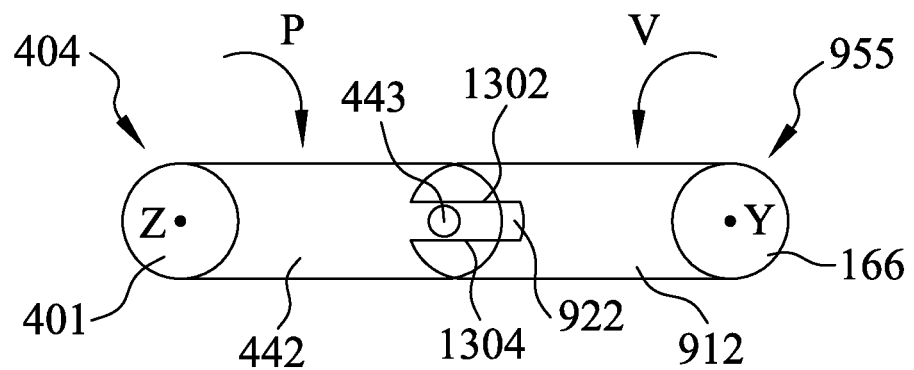

FIG. 13G shows the relative positional relationship between the third engageable and disengageable actuating structure 404 and the third engageable and disengageable actuated structure 955 when the actuating shaft 118 rotates clockwise within the third angle range. Specifically, when the actuating shaft 118 continues to rotate clockwise, the third rod 443 pushes the second side wall 1304 of the third groove 922, such that the third valve body plate 912 rotates. Thereby, the third engageable and disengageable actuating structure 404 drives the third engageable and disengageable actuated structure 955 to rotate counterclockwise (for example, as indicated by an arrow V in FIG. 13G).

Figure 13H:
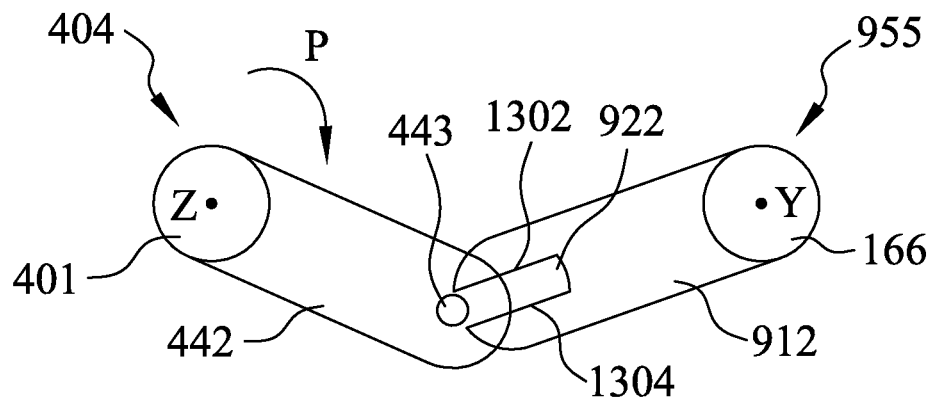

FIG. 13H shows that, when the actuating shaft 118 rotates to the first boundary angle of the third angle range, the third engageable and disengageable actuating structure 404 is disengaged from the third engageable and disengageable actuated structure 955. Specifically, when the actuating shaft 118 continues to rotate clockwise, the third rod 443 is disengaged from the third groove 922, such that the actuating shaft 118 continues to rotate clockwise while the third engageable and disengageable actuated structure 955 retains in the first position. That is, at this time, the third engageable and disengageable actuating structure 404 cannot drive the third engageable and disengageable actuated structure 955 to rotate.

It should be noted that the third angle range is the angle at which the third engageable and disengageable actuating structure 404 can rotate to engage with the third engageable and disengageable actuated structure 955 so as to drive the third engageable and disengageable actuated structure 955 to rotate.

With continued reference to FIGS. 4A-4B, it can be seen that the first engageable and disengageable actuating structure 402, the second engageable and disengageable actuating structure 403, and the third engageable and disengageable actuating structure 404 are provided along different angle directions of the shaft rod 401. With such arrangement, when the shaft rod 401 rotates at different angles, the engageable and disengageable actuating structures on the shaft rod 401 can selectively engage with the engageable and disengageable actuated structures on the valve bodies, thereby driving different valve bodies to rotate.

In the present disclosure, the specific structures and positional relationships of a first valve body 132, a second valve body 134, a third valve body 136 and a fourth valve body 138, as well as a first engaging and disengaging structure, a second engaging and disengaging structure, a third engaging and disengaging structure and a fourth engaging and disengaging structure can be configured such that: the openings on the first valve body 132 can cooperate with a first flow port 361 and a second flow port 362, so that the openings on the first valve body 132 can selectively open at least one of the first flow port 361 and the second flow port 362; an opening on the second valve body 134 can cooperate with a third flow port 363 and a sixth flow port 366, so that the opening on the second valve body 134 can selectively open at least one of the third flow port 363 and the sixth flow port 366; the openings on the third valve body 136 can cooperate with a seventh flow port 367 and an eighth flow port 368, so that the openings on the third valve body 136 can selectively open at least one of the seventh flow port 367 and the eighth flow port 368; and the openings on the fourth valve body 138 can cooperate with a fifth flow port 365, so that the openings on the fourth valve body 138 can selectively open the fifth flow port 365.

When the actuating shaft 118 rotates, one or more of the first valve body 132, the second valve body 134, the third valve body 136, and the fourth valve body 138 can be selectively rotated, such that different fluid passages are formed inside the regulating valve 100. As an example, the regulating valve 100 can achieve multiple fluidly connection relationships as shown in Table 1.

TABLE 1

| No. | First flow port 361 | Second flow port 362 | Third flow port 363 | Fourth flow port 364 | Fifth flow port 365 | Sixth flow port 366 | Seventh flow port 367 | Eighth flow port 368 |
| --- | --- | --- | --- | --- | --- | --- | --- | --- |
| 1 | o | o | o | o | o | x | o | o |
| 2 | o | o | R | o | o | R | o | o |
| 3 | o | o | x | o | x | R | o | x |
| 4 | o | o | x | o | x | o | o | x |
| 5 | o | o | x | o | o | o | o | x |
| 6 | R | x | x | o | o | o | R | x |
| 7 | x | x | x | o | x | o | R | x |
| 8 | x | x | x | o | x | o | x | x |
| 9 | x | o | R | o | x | o | x | x |
| 10 | x | o | o | o | x | x | x | x |

The serial numbers 1-10 on the left side of Table 1 indicate that the actuating shaft 118 rotates at different angles. For example, the serial number 1 indicates that the actuating shaft 118 rotates at a first angle. It should be noted that, as an example, the serial numbers 1-10 indicate the angles that the actuating shaft 118 rotates from an initial angle in the same direction. It should also be noted that the actuating shaft 118 can rotate in both directions (i.e., rotating clockwise and counterclockwise).

The symbol "O" in Table 1 indicates that the flow port is fully connected, that is, the flow port on the housing is aligned with the opening on the valve body, such that the fluid can flow through the entire area of the flow port on the housing. The symbol "R" in Table 1 indicates that the flow port is partially connected, that is, the flow port on the housing is partially aligned with the opening on the valve body, such that the fluid can only flow through the portion where the flow port is aligned with the opening of the valve body. The symbol "x" in Table 1 indicates that the flow port is disconnected, that is, the flow port is blocked by the valve body main body, such that the fluid cannot flow through the flow port on the housing. It should be noted that "connected" in the present disclosure includes a fully connected state and a partially connected state.

A plurality of fluid passages can be formed in the valve 100 by controlling the opening and closing states of the flow ports on the housing, and the cooperation between the valve bodies. Each fluid passage is used to communicate two corresponding flow ports, so that the external pipes connected to the two corresponding flow ports can be communicated through the fluid passage. The plurality of fluid passages in the valve 100 can be connected or disconnected by controlling the rotation of the respective valve bodies. For example, if the fourth flow port 364 listed in Table 1 is used as a fluid inlet of the valve 100, and the remaining seven flow ports are used as fluid outlets of the valve 100, there are seven fluid passages in the valve 100, the seven fluid passages comprising a fluid passage 1, a fluid passage 2, a fluid passage 3, a fluid passage 5, a fluid passage 6, a fluid passage 7, and a fluid passage 8. The fluid passage 1 connects the fourth flow port 364 and the first flow port 361, the fluid passage 2 connects the fourth flow port 364 and the second flow port 362, the fluid passage 3 connects the fourth flow port 364 and the third flow port 363, the fluid passage 5 connects the fourth flow port 364 and the fifth flow port 365, the fluid passage 6 connects the fourth flow port 364 and the sixth flow port 366, the fluid passage 7 connects the fourth flow port 364 and the seventh flow port 367, and the fluid passage 8 connects the fourth flow port 364 and the eighth flow port 368.

When the valve 100 is at a first angle, the valve body opening portion on the first valve body 132 is aligned with the fourth flow port 364, so that the first flow port 151 is opened; the valve body opening portion on the first valve body 132 is aligned with the second flow port 362, so that the second flow port 362 is opened; the valve body opening portion on the second valve body 134 is aligned with the third flow port 363, so that the third flow port 363 is opened; the valve body opening portion on the fourth valve body 138 is aligned with the fifth flow port 365, so that the fifth flow port 365 is opened; the valve body opening portion on the third valve body 136 is aligned with the seventh flow port 367, so that the seventh flow port 367 is opened; the valve body opening portion on the third valve body 136 is aligned with the eighth flow port 368, so that the eighth flow port 368 is opened; and the valve body opening portion on the second valve body 134 is not aligned with the sixth flow port 366, so that the sixth flow port 366 is closed or blocked. At this time, the fluid passage 1 that connects the fourth flow port 364 and the first flow port 361 is connected, the fluid passage 2 that connects the fourth flow port 364 and the second flow port 362 is connected, the fluid passage 3 that connects the fourth flow port 364 and the third flow port 363 is connected, the fluid passage 5 that connects the fourth flow port 364 and the fifth flow port 365 is connected, the fluid passage 7 that connects the fourth flow port 364 and the seventh flow port 367 is connected, the fluid passage 8 that connects the fourth flow port 364 and the eighth flow port 368 is connected, while the fluid passage 6 that connects the fourth flow port 364 and the sixth flow port 366 is disconnected.

When the valve 100 is at a second angle, the valve body opening portion on the first valve body 132 is aligned with the fourth flow port 364, so that the first flow port 151 is opened; the valve body opening portion on the first valve body 132 is aligned with the second flow port 362, so that the second flow port 362 is opened; the valve body opening portion on the second valve body 134 is aligned with the third flow port 363, so that the third flow port 363 is opened; the valve body opening portion on the fourth valve body 138 is aligned with the fifth flow port 365, so that the fifth flow port 365 is opened; the valve body opening portion on the second valve body 134 is aligned with the sixth flow port 366, so that the sixth flow port 366 is opened; the valve body opening portion on the third valve body 136 is aligned with the seventh flow port 367, so that the seventh flow port 367 is opened; and the valve body opening portion on the third valve body 136 is aligned with the eighth flow port 368, so that the eighth flow port 368 is opened. At this time, the fluid passage 1 that connects the fourth flow port 364 and the first flow port 361 is connected, the fluid passage 2 that connects the fourth flow port 364 and the second flow port 362 is connected, the fluid passage 3 that connects the fourth flow port 364 and the third flow port 363 is connected, the fluid passage 5 that connects the fourth flow port 364 and the fifth flow port 365 is connected, the fluid passage 6 that connects the fourth flow port 364 and the sixth flow port 366 is connected, the fluid passage 7 that connects the fourth flow port 364 and the seventh flow port 367 is connected, and the fluid passage 8 that connects the fourth flow port 364 and the eighth flow port 368 is connected.

Similarly, when the valve 100 is at the third to tenth angles, the connected and disconnected states of each fluid passage in the valve 100 can be obtained according to Table 1.

It should be noted that the valve 100 in the embodiment shown in FIGS. 1A to 14 is not limited to the above disclosure. According to the needs of a cooling path of a cooling system, a variety of fluid passages can be formed in the valve 100 by configuring a power device such as a pump, so that the valve 100 is used as a switching device of the cooling path to achieve the purpose of switching the cooling path.

Although the way of grooves and rods is used to achieve a engaging and disengaging structure in the present disclosure, those skilled in the art can understand that other cooperative ways to achieve such engagement and disengagement (for example, a clasping device, a gear engagement device) also fall within the scope of protection of the present disclosure.

The regulating valve 100 in the present disclosure can switch different passages for the fluid and can also control the flow of each passage by the arrangement of the openings on the valve bodies and the flow ports. With such arrangement, a control assembly in the system can switch different passages for the fluid by controlling less elements, and the stability of system control can be enhanced while integrated control is achieved.

In order to ensure the leakproofness between the flow ports and the valve bodies when each flow port in the regulating valve 100 is not aligned with the opening on the valve body (that is, the flow port is closed), the regulating valve 100 further comprises a first group of sealing elements and a second group of sealing elements. Each of the first group of sealing elements is disposed between the first valve body 132, the second valve body 134 or the fourth valve body 138 and each of the first group of flow ports. Each of the first group of sealing elements is configured to abut against the cavity wall where each of the first group of flow ports is located, such that when the valve body rotates, the first group of sealing elements can abut against the cavity wall and does not rotate with the rotation of the valve body. The second group of sealing elements include two sealing elements, one of the two sealing elements is disposed between the seventh flow port 367 and the third valve body 136, and the other one of the two sealing elements is disposed between the eighth flow port 368 and the third valve body 136. Since the pump outlet flow port 369 in the second group of flow ports is connected to the outlet of the pump, no sealing element is provided there.

When the valve body rotates, because of the friction between the valve body and the sealing element, the actuator that drives the valve body to rotate requires a larger driving force to drive the valve body to rotate, so as to overcome the friction between the valve body and the sealing element. When the conventional valve drives one or more valve bodies to rotate, the actuating shaft of the valve needs to overcome the friction generated by the relative movement of all the sealing elements and the valve bodies provided in the housing, such that the required power of the actuator is relatively large. The actuating shaft 118 of the regulating valve 100 in the present disclosure selectively makes actuating structure engage with the actuated structure at one time, and the actuating structure drives the actuated structure rotate, so that the actuating shaft 118 drives at least one of the first valve body 132, the second valve body 134, the third valve body 136, and the fourth valve body 138 to rotate.

The regulating valve 100 in the present disclosure also has the following advantages: when the fluid passage required in the regulating valve 100 can be realized by the rotation of the valve body on one side of the actuating shaft 118, since the valve body on the other side does not rotate, there is no friction between the non-rotating valve body and the sealing element, the driving force provided by the actuator is reduced. The actuator is only required to provide the power to overcome the friction produced by the valve body which needs to be rotated by the actuating shaft 118. The states of the valve bodies in the regulating valve 100 at the serial numbers 8-10 in Table 1 will be described below as an example.

Figure 14:
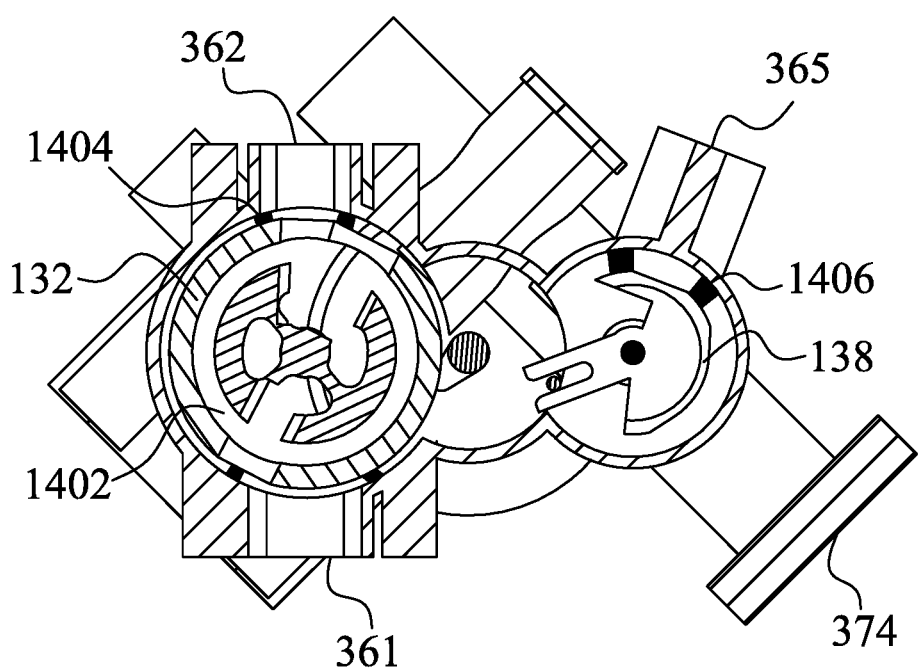
FIG. 14 is a schematic view of the regulating valve shown in FIG. 1A cut to a first flow port and a second flow port in a horizontal direction.

FIG. 14 is a schematic view of the regulating valve 100 shown in FIG. 1A cut to the first flow port 361 and the second flow port 362 in the horizontal direction. FIG. 14 shows a first sealing element 1402 disposed between the first valve body 132 and the first flow port 361, a second sealing element 1404 disposed between the first valve body 132 and the second flow port 362, and a third sealing element 1406 disposed between the fourth valve body 138 and the fifth flow port 365. When the actuating shaft 118 rotates within the angle range shown in the serial numbers 8-10, only the first valve body 132 and the second valve body 134 need to be rotated, so the actuator for driving the actuating shaft 118 to rotate only needs to provide what can overcome the friction of the sealing elements on the first valve body 132 and the second valve body 134.

When the output power of the actuator is constant, the valve provided by the present disclosure is particularly suitable for disclosures that provide more fluid passages, because the actuating shaft of the valve of the present disclosure only needs to overcome the frictional force generated by the sealing element between the actuated at least one group of valve bodies and the housing, but not to overcome the frictional force generated by all the sealing elements between the valve bodies and the housing. Therefore, the output power of the actuator 190 does not need to increase with the increase of fluid passages in the valve.

Although only some features of the present disclosure are illustrated and described herein, those skilled in the art may make various improvements and changes. Therefore, it should be understood that the appended claims intend to cover all the foregoing improvements and changes that fall within the substantial spirit and scope of the present disclosure.

The invention claimed is:

1. An adjustable valve, comprising:
a housing comprising a first cavity and a second cavity;
a first valve body disposed within the first cavity;
a second valve body disposed within the first cavity, wherein the first valve body and the second valve body can rotate about a first axis (X);
a third valve body disposed within the second cavity;
a fourth valve body disposed within the first cavity, wherein the third valve body and the fourth valve body can rotate about a second axis (Y); and
an actuating shaft which is rotatably disposed within the first cavity and can selectively actuate one or more of the first valve body, the second valve body, the third valve body, and the fourth valve body to rotate,
wherein the first axis (X) and the second axis (Y) are noncollinear.

2. The adjustable valve according to claim 1, further comprising:
a first engagable and disengagable actuating structure, a second engagable and disengagable actuating structure, and a third engagable and disengagable actuating structure provided on the actuating shaft,
wherein during the rotation of the actuating shaft, the first engagable and disengagable actuating structure, the second engagable and disengagable actuating structure, and the third engagable and disengagable actuating structure can rotate together.

3. The adjustable valve according to claim 2, further comprising:
a first engagable and disengagable actuated structure provided on the first valve body, wherein the first engagable and disengagable actuated structure can be cooperated with the first engagable and disengagable actuating structure to form a first engaging and disengaging structure, such that the first valve body can engage or disengage with the actuating shaft;
a second engagable and disengagable actuated structure provided on the second valve body, wherein the second engagable and disengagable actuated structure can be cooperated with the second engagable and disengagable actuating structure to form a second engaging and disengaging structure, such that the second valve body can engage or disengage with the actuating shaft;
a third engagable and disengagable actuated structure provided on the third valve body, wherein the third engagable and disengagable actuated structure can be cooperated with the third engagable and disengagable actuating structure to form a third engaging and disengaging structure, such that the third valve body can engage or disengage with the actuating shaft; and
a fourth engagable and disengagable actuated structure provided on the fourth valve body, wherein the fourth engagable and disengagable actuated structure can be cooperated with the third engagable and disengagable actuating structure to form a fourth engaging and disengaging structure, such that the fourth valve body can engage or disengage with the actuating shaft.

4. The adjustable valve according to claim 3, wherein:
the first engagable and disengagable actuating structure comprises a plurality of first rods, and the first engagable and disengagable actuated structure comprises a plurality of first grooves;
the second engagable and disengagable actuating structure comprises a second rod, and the second engagable and disengagable actuated structure comprises a second groove; and
the third engagable and disengagable actuating structure comprises a third rod, the third engagable and disengagable actuated structure comprises a third groove, and the fourth engagable and disengagable actuated structure comprises a fourth groove.

5. The adjustable valve according to claim 4, wherein:
when the actuating shaft rotates within a first angle range, at least one of the plurality of first rods can engage with one of the plurality of first grooves, such that the actuating shaft can drive the first valve body to rotate;
when the actuating shaft rotates within a second angle range, the second rod can engage with the second groove, such that the actuating shaft can drive the second valve body to rotate;
when the actuating shaft rotates within a third angle range, the third rod can engage with the third groove, such that the actuating shaft can drive the third valve body to rotate; and
when the actuating shaft rotates within a fourth angle range, the third rod can engage with the fourth groove, such that the actuating shaft can drive the fourth valve body to rotate.

6. The adjustable valve according to claim 1, wherein:
the first cavity has a first group of flow ports on a cavity wall thereof, and the second cavity has a second group of flow ports on the cavity wall thereof;
the first valve body has a first group of openings thereon, the second valve body has a second group of openings thereon, the third valve body has a third group of openings thereon, and the fourth valve body has a fourth group of openings thereon.

7. The adjustable valve according to claim 6, wherein:
the top portion of the housing has a step portion, the second cavity is provided above the step portion and the first cavity is provided below the step portion, such that the second cavity is at least partially located above the first cavity.

8. The adjustable valve according to claim 5, wherein:
the second group of flow ports include a pump outlet flow port; and
the upper portion of the first cavity is used for connecting to a pump inlet and the pump outlet flow port is used for connecting to the pump outlet, such that the first cavity can fluidly communicate with the second cavity via the pump.

9. The adjustable valve according to claim 8, further comprising:
a first group of sealing elements and a second group of sealing elements,
wherein each sealing element of the first group of sealing elements is respectively disposed between the first valve body and a corresponding one of the first group of flow ports, between the second valve body and a corresponding one of the first group of flow ports, and between the fourth valve body and a corresponding one of the first group of flow ports, and
wherein the second group of flow ports include a seventh flow port and an eighth flow port, one of the second group of sealing elements is disposed between the third valve body and the seventh flow port, and another of the second group of sealing elements is disposed between the third valve body and the eighth flow port.

10. The adjustable valve according to claim 1, wherein:
an actuator is disposed under the housing, and the actuating shaft is actuated by the actuator to rotate.

11. An adjustable valve, comprising:
a housing comprising a first cavity and a second cavity;
a first valve body disposed within the first cavity;
a second valve body disposed within the first cavity, wherein the first valve body and the second valve body can rotate about a first axis (X);
a third valve body disposed within the second cavity;
a fourth valve body disposed within the first cavity, wherein the third valve body and the fourth valve body can rotate about a second axis (Y); and
an actuating shaft which is rotatably disposed within the first cavity and can selectively actuate one or more of the first valve body, the second valve body, the third valve body, and the fourth valve body to rotate,
wherein a top portion of the housing has a step portion, the second cavity is provided above the step portion and the first cavity is provided below the step portion, such that the second cavity is at least partially located above the first cavity.

12. The adjustable valve according to claim 11, further comprising:
a first engagable and disengagable actuating structure, a second engagable and disengagable actuating structure, and a third engagable and disengagable actuating structure provided on the actuating shaft,
wherein during the rotation of the actuating shaft, the first engagable and disengagable actuating structure, the second engagable and disengagable actuating structure, and the third engagable and disengagable actuating structure can rotate together.

13. The adjustable valve according to claim 12, further comprising:
a first engagable and disengagable actuated structure provided on the first valve body, wherein the first engagable and disengagable actuated structure can be cooperated with the first engagable and disengagable actuating structure to form a first engaging and disengaging structure, such that the first valve body can engage or disengage with the actuating shaft;
a second engagable and disengagable actuated structure provided on the second valve body, wherein the second engagable and disengagable actuated structure can be cooperated with the second engagable and disengagable actuating structure to form a second engaging and disengaging structure, such that the second valve body can engage or disengage with the actuating shaft;
a third engagable and disengagable actuated structure provided on the third valve body, wherein the third engagable and disengagable actuated structure can be cooperated with the third engagable and disengagable actuating structure to form a third engaging and disengaging structure, such that the third valve body can engage or disengage with the actuating shaft; and
a fourth engagable and disengagable actuated structure provided on the fourth valve body, wherein the fourth engagable and disengagable actuated structure can be cooperated with the third engagable and disengagable actuating structure to form a fourth engaging and disengaging structure, such that the fourth valve body can engage or disengage with the actuating shaft.

14. The adjustable valve according to claim 13, wherein:
the first engagable and disengagable actuating structure comprises a plurality of first rods, and the first engagable and disengagable actuated structure comprises a plurality of first grooves;
the second engagable and disengagable actuating structure comprises a second rod, and the second engagable and disengagable actuated structure comprises a second groove; and the third engagable and disengagable actuating structure comprises a third rod, the third engagable and disengagable actuated structure comprises a third groove, and the fourth engagable and disengagable actuated structure comprises a fourth groove.

15. The adjustable valve according to claim 14, wherein:
when the actuating shaft rotates within a first angle range, at least one of the plurality of first rods can engage with one of the plurality of first grooves, such that the actuating shaft can drive the first valve body to rotate;
when the actuating shaft rotates within a second angle range, the second rod can engage with the second groove, such that the actuating shaft can drive the second valve body to rotate;
when the actuating shaft rotates within a third angle range, the third rod can engage with the third groove, such that the actuating shaft can drive the third valve body to rotate; and
when the actuating shaft rotates within a fourth angle range, the third rod can engage with the fourth groove, such that the actuating shaft can drive the fourth valve body to rotate.

16. The adjustable valve according to claim 11, wherein:
the first cavity has a first group of flow ports on a cavity wall thereof, and the second cavity has a second group of flow ports on the cavity wall thereof;
the first valve body has a first group of openings thereon, the second valve body has a second group of openings thereon, the third valve body has a third group of openings thereon, and the fourth valve body has a fourth group of openings thereon.

17. The adjustable valve according to claim 15, wherein:
the second group of flow ports include a pump outlet flow port; and
the upper portion of the first cavity is used for connecting to a pump inlet and the pump outlet flow port is used for connecting to the pump outlet, such that the first cavity can fluidly communicate with the second cavity via the pump.

18. The adjustable valve according to claim 17, further comprising:
a first group of sealing elements and a second group of sealing elements, wherein each sealing element of the first group of sealing elements is respectively disposed between the first valve body and a corresponding one of the first group of flow ports, between the second valve body and a corresponding one of the first group of flow ports, and between the fourth valve body and a corresponding one of the first group of flow ports, and
wherein the second group of flow ports include a seventh flow port and an eighth flow port, one of the second group of sealing elements is disposed between the third valve body and the seventh flow port, and another of the second group of sealing elements is disposed between the third valve body and the eighth flow port.

19. The adjustable valve according to claim 11, wherein:
an actuator is disposed under the housing, and the actuating shaft is actuated by the actuator to rotate.

* * * * *